United States Patent
Takehisa et al.

(10) Patent No.: US 11,339,072 B2
(45) Date of Patent: *May 24, 2022

(54) ION REMOVING SYSTEM

(71) Applicant: Panasonic Intellectual Property Management Co., Ltd., Osaka (JP)

(72) Inventors: Ayane Takehisa, Nara (JP); Yasunari Maeda, Osaka (JP); Tomohiro Akita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/043,523

(22) PCT Filed: May 31, 2019

(86) PCT No.: PCT/JP2019/021700
§ 371 (c)(1),
(2) Date: Sep. 29, 2020

(87) PCT Pub. No.: WO2020/044694
PCT Pub. Date: Mar. 5, 2020

(65) Prior Publication Data
US 2021/0122654 A1 Apr. 29, 2021

(30) Foreign Application Priority Data
Aug. 27, 2018 (JP) .............................. JP2018-158749

(51) Int. Cl.
*C02F 9/00* (2006.01)
*C02F 1/20* (2006.01)
(Continued)

(52) U.S. Cl.
CPC .................. *C02F 9/00* (2013.01); *C02F 1/20* (2013.01); *C02F 1/4618* (2013.01); *C02F 1/66* (2013.01); *C02F 5/02* (2013.01); *C02F 2101/10* (2013.01)

(58) Field of Classification Search
USPC ......................................................... 210/199
See application file for complete search history.

(56) References Cited

U.S. PATENT DOCUMENTS

2002/0185005 A1* 12/2002 Deng ................... B01D 53/047
95/96
2011/0056876 A1* 3/2011 Ide ............................ C02F 9/00
210/192
(Continued)

FOREIGN PATENT DOCUMENTS

EP 3590894 A1 1/2020
JP 2000-140840 A 5/2000
(Continued)

OTHER PUBLICATIONS

W0 2018/159693—ion removal device, Maeda et al., Published Sep. 7, 2018. (Year: 2018).*
(Continued)

*Primary Examiner* — Nina Bhat
(74) *Attorney, Agent, or Firm* — Renner, Otto, Boisselle & Sklar, LLP

(57) ABSTRACT

Ion removing system includes primary-side ion removing apparatus that includes primary-side hard water storage part storing hard water and primary-side fine bubble generating part generating and supplying fine bubbles to primary-side hard water storage part and that causes fine bubbles to adsorb first metal ions in hard water in primary-side hard water storage part to remove first metal ions from hard water, secondary-side pH adjustment apparatus increasing pH of hard water from which first metal ions are removed by
(Continued)

primary-side ion removing apparatus, and secondary-side ion removing apparatus that includes secondary-side hard water storage part storing hard water having pH increased by secondary-side pH adjustment apparatus and secondary-side fine bubble generating part generating and supplying fine bubbles to secondary-side hard water storage part and that causes fine bubbles to adsorb second metal ions in hard water in secondary-side hard water storage part to remove second metal ions from hard water.

6 Claims, 23 Drawing Sheets

(51) Int. Cl.
    *C02F 1/461*     (2006.01)
    *C02F 1/66*     (2006.01)
    *C02F 5/02*     (2006.01)
    *C02F 101/10*     (2006.01)

(56) References Cited

U.S. PATENT DOCUMENTS

2020/0407254 A1* 12/2020 Akita .................. C02F 5/08
2021/0221722 A1* 7/2021 Maeda ................. C02F 1/28

FOREIGN PATENT DOCUMENTS

| JP | 2008-006405 A | 1/2008 | |
|---|---|---|---|
| JP | 2010-078239 A | 4/2010 | |
| JP | 2010-091125 A | 4/2010 | |
| JP | 2011-056345 A | 3/2011 | |
| JP | 2011-161407 A | 8/2011 | |
| WO | 2018/159693 A1 | 9/2018 | |
| WO | WO-2018159693 A1 * | 9/2018 | ............... C02F 1/58 |

OTHER PUBLICATIONS

JP 5621827, English Translation "Mineral Component removal device and hot water supply device", published on Nov. 12, 2014. (Year: 2014).*

WO2011/077539, English Translation Bubble supply device, bubble supply method and water heater, published May 2, 2013 (Year: 2013).*

International Preliminary Report on Patentability for corresponding Application No. PCT/JP2019/021700, dated May 31, 2019, English translation.

International Search Report for corresponding Application No. PCT/JP2019/021700, dated Jul. 9, 2019.

Extended European Search Report for corresponding Application No. 19853836.5, dated Sep. 3, 2021.

Zhang DD et al: "Natural water softening processes by waterfall effects in karst areas", Desalination, Elsevier, Amsterdam, NL, vol. 129, No. 3, Aug. 10, 2000, pp. 247-259, XP004210365.

* cited by examiner

ION REMOVING SYSTEM

TECHNICAL FIELD

The present disclosure relates to an ion removing system.

BACKGROUND ART

An ion removing system removing metal ions in hard water has hitherto been disclosed (see, e.g., Patent Document 1).

The ion removing system of Patent Document 1 removes metal ions (calcium ions and magnesium ions) in hard water with an ion exchange resin. Specifically, by allowing hard water to flow into a treatment tank including an ion exchange resin having sodium ions attached to a surface, the metal ions in the hard water are replaced with the sodium ions to remove the metal ions from the hard water. As a result, the hardness of the hard water is reduced to generate soft water. The metal ions present in the hard water are captured on the surface of the ion exchange resin.

PRIOR ART DOCUMENT

Patent Document

Patent Document 1: JP 2000-140840 A

SUMMARY OF THE INVENTION

Subjects to be Solved by the Invention

However, the ion removing system of Patent Document 1 requires a large amount of salt water for regenerating the ion exchange resin having captured the metal ions and has a problem of troublesome maintenance. Moreover, a regeneration treatment generates wastewater containing a large amount of salt water, causing problems of soil pollution and an increased load on sewage treatment. Furthermore, treated water softened by an ion removing apparatus has a high concentration of sodium ions and may not be recommended as drinking water in some regions.

As described above, the ion removing system using an ion exchange resin has room for improvement from the viewpoints of maintainability and environmental properties.

Therefore, an object of the present disclosure is to solve the problems and to provide an ion removing system excellent in maintainability and environmental properties.

Means for Solving the Subjects

To achieve the object, the ion removing system according to the present disclosure comprises:

a primary-side ion removing apparatus that includes a primary-side hard water storage part storing hard water and a primary-side fine bubble generating part generating and supplying fine bubbles to the primary-side hard water storage part and that causes the fine bubbles to adsorb first metal ions in the hard water in the primary-side hard water storage part to remove the first metal ions from the hard water;

a secondary-side pH adjustment apparatus increasing pH of the hard water from which the first metal ions are removed by the primary-side ion removing apparatus; and a secondary-side ion removing apparatus that includes a secondary-side hard water storage part storing hard water having pH increased by the secondary-side pH adjustment apparatus and a secondary-side fine bubble generating part generating and supplying fine bubbles to the secondary-side hard water storage part and that causes the fine bubbles to adsorb second metal ions in the hard water in the secondary-side hard water storage part to remove the second metal ions from the hard water.

Effect of the Invention

The present disclosure can provide the ion removing system having excellent maintainability and environmental properties.

MODES FOR CARRYING OUT THE INVENTION

Figure 1:
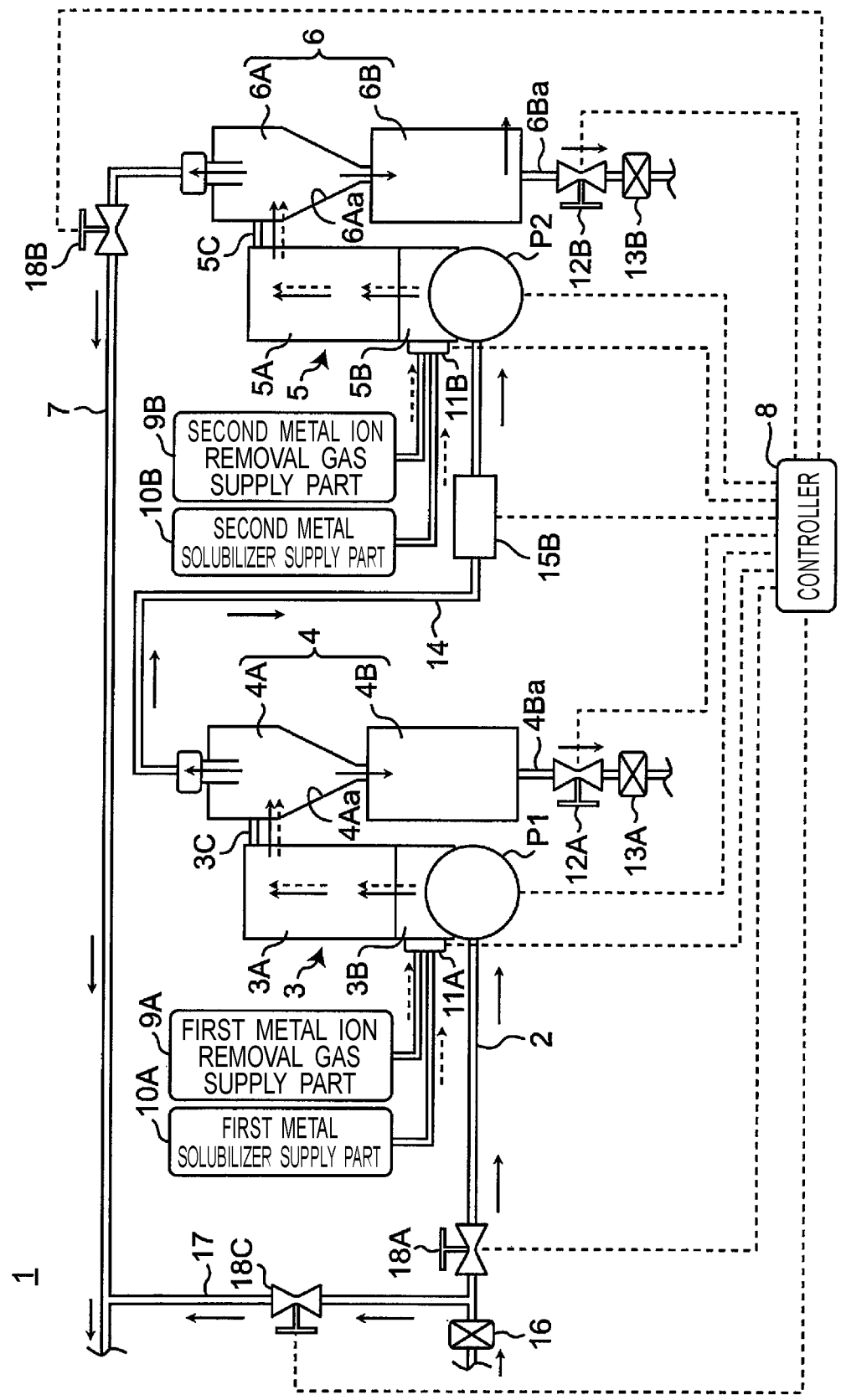
FIG. 1 is a schematic diagram of an ion removing system according to a first embodiment.

As a result of intensive studies, the present inventors found novel knowledge that removal of metal ions can be promoted by using "fine bubbles" not conventionally used in an ion removal technique (softening technique) for removing metal ions from hard water, thereby completing the following invention.

An ion removing system according to an aspect of the present disclosure comprises:

a primary-side ion removing apparatus that includes a primary-side hard water storage part storing hard water and a primary-side fine bubble generating part generating and supplying fine bubbles to the primary-side hard water storage part and that causes the fine bubbles to adsorb first metal ions in the hard water in the primary-side hard water storage part to remove the first metal ions from the hard water;

a secondary-side pH adjustment apparatus increasing pH of the hard water from which the first metal ions are removed by the primary-side ion removing apparatus; and a secondary-side ion removing apparatus that includes a secondary-side hard water storage part storing hard water having pH increased by the secondary-side pH adjustment apparatus and a secondary-side fine bubble generating part generating and supplying fine bubbles to the secondary-side hard water storage part and that causes the fine bubbles to adsorb second metal ions in the hard water in the secondary-side hard water storage part to remove the second metal ions from the hard water.

According to this configuration, since the first and second metal ions are removed from the hard water by using the fine bubbles, the need for a large amount of salt water required for regenerating the ion exchange resin can be eliminated. This can simplify a regeneration treatment to make the maintenance easier. Additionally, since regeneration wastewater containing salt water is not generated, soil pollution and a load on sewage treatment can be suppressed to improve environmental properties. Furthermore, concentration of sodium ions is not increased in treated water, so that the generated treated water can be used as drinking water.

As the first metal ions (e.g., calcium ions) are removed from the hard water, the negative charges present on the surfaces of the fine bubbles decrease, and the pH of the hard water is reduced. As a result, the power of adsorption of the second metal ions by the fine bubbles decreases, which makes it difficult to remove the second metal ions. In this regard, according to the configuration, the pH of the hard water with the first metal ions removed is increased by the secondary-side pH adjustment apparatus to increase the power of adsorption of the second metal ions (e.g., magnesium ions) by the fine bubbles, so that the removal efficiency of the second metal ions can be improved.

The secondary-side pH adjustment apparatus may include a secondary-side degassing apparatus removing carbon dioxide contained in the hard water from which the first metal ions are removed by the primary-side ion removing apparatus. According to the configuration, the pH of the hard water can be increased by removing carbon dioxide contained in the hard water.

The secondary-side pH adjustment apparatus may include a secondary-side electrolysis apparatus electrolyzing the hard water from which the first metal ions are removed by the primary-side ion removing apparatus, to generate acidic water and alkaline water, and may be configured to supply the alkaline water as hard water having the increased pH to the secondary-side hard water storage part. According to this configuration, the pH of the hard water can be increased by separating the acidic water from the hard water while leaving the alkaline water.

A primary-side pH adjustment apparatus increasing the pH of the hard water contained in the primary-side hard water storage part may further be included. According to this configuration, the negative charges present on the surfaces of the fine bubbles are increased to increase the power of adsorption of the first metal ions by the fine bubbles, so that the removal efficiency of the first metal ions can be improved.

The primary-side pH adjustment apparatus may include a primary-side degassing apparatus removing carbon dioxide contained in the hard water. According to the configuration, the pH of the hard water can be increased by removing carbon dioxide contained in the hard water.

The primary-side pH adjustment apparatus may include a primary-side electrolysis apparatus electrolyzing the hard water to generate acidic water and alkaline water and may be configured to supply the alkaline water as the hard water to the primary-side hard water storage part. According to this configuration, the pH of the hard water can be increased by separating the acidic water from the hard water while leaving the alkaline water.

First to third embodiments according to the present disclosure will hereinafter be described in detail with reference to the drawings.

First Embodiment

FIG. 1 is a diagram showing a schematic configuration of an ion removing system 1 according to a first embodiment.

General Configuration

The ion removing system 1 according to the first embodiment includes a primary-side flow path 2, a primary-side ion removing apparatus 3, a primary-side separating apparatus 4, a secondary-side ion removing apparatus 5, and a secondary-side separating apparatus 6, and a secondary-side flow path 7.

The primary-side flow path 2 is connected to the primary-side ion removing apparatus 3. The primary-side flow path 2 is a flow path for supplying hard water to the primary-side ion removing apparatus 3. In the first embodiment, a pump P1 is disposed in a connecting portion between the primary-side flow path 2 and the primary-side ion removing apparatus 3. The pump P functions to cause the hard water flowing through the primary-side flow path 2 to flow through the primary-side ion removing apparatus 3 to the primary-side separating apparatus 4. The drive of the pump P1 is controlled by a controller 8.

The primary-side ion removing apparatus 3 includes a primary-side hard water storage part 3A storing hard water, and a primary-side fine bubble generating part 3B generating and supplying fine bubbles to the primary-side hard water storage part 3A. The primary-side ion removing apparatus 3 is an apparatus causing fine bubbles to adsorb first metal ions in hard water in the primary-side hard water storage part 3A and thereby removing the first metal ions from the hard water. The primary-side fine bubble generating part 3B is disposed downstream of the pump P1 in the flow direction of the hard water so as to prevent gas from entering the pump P1.

In the first embodiment, the metal ions are calcium ions ($Ca^{2+}$). In the first embodiment, the fine bubbles are bubbles having a diameter of 100 μm or less. The fine bubbles include microbubbles (e.g., having a diameter of 1 μm to 100 μm) and nanobubbles (e.g., having a diameter of less than 1 μm). The microbubbles may be bubbles recognizable as those having a bubble diameter on the order of micrometers by those skilled in the field of water treatment. The nanobubbles may be bubbles recognizable as those having a bubble diameter on the order of nanometers by those skilled in the field of water treatment. The fine bubbles have properties different from ordinary bubbles, such as long retention time in water, each of bubbles hardly increasing in diameter and less likely to combine with other bubbles, and a large contact area facilitating a chemical reaction.

The fine bubbles may include bubbles having a diameter of 100 μm or more (such as milli-bubbles) in a small proportion. For example, bubbles having a diameter of 100 μm or less in a proportion of 90% or more may be defined as the fine bubbles. Additionally, conditions such as having a diameter of 60 μm or less in a proportion of 50% or more and having a diameter of 20 μm or less in a proportion of 5% or more may be added. When the diameter of bubbles (bubble diameter) is measured, for example, hard water containing fine bubbles may directly be photographed by a high-speed camera, and the bubble diameter may be calculated by a three-point method through image processing or may be measured by any other method. The timing of measuring the bubble diameter may be any timing as long as the fine bubbles are retained at the time. Examples of conditions of the measuring method using a high-speed camera described above are as follows.

High-speed camera: FASTCAM 1024 PCI (Photron)
Lens system: Z16 APO (Leica)
Objective lens: Planapo 2.0× (Leica)
Shooting speed: 1000 fps
Shutter speed: 1/505000 sec
Image area: 1024×1024 pixels (microbubble shooting area: 1.42 mm×1.42 mm, milli-bubble shooting area: 5.69 mm×5.69 mm)
Image processing software: Image-Pro Plus (Media Cybermatics)

In the first embodiment, a first metal ion removal gas supply part 9A and a first metal solubilizer supply part 10A are connected via a primary-side gas switching mechanism 11A to the primary-side fine bubble generating part 3B.

The first metal ion removal gas supply part 9A is configured to supply a first metal ion removal gas for removing the first metal ions in hard water to the primary-side fine bubble generating part 3B. In the first embodiment, the first metal ion removal gas supply part 9A is configured to supply "air" as the first metal ion removal gas to the primary-side fine bubble generating part 3B. The first metal ion removal gas supply part 9A may include a tank filled with the first metal ion removal gas, for example. The first metal ion removal gas supply part 9A may be an apparatus generating the first metal ion removal gas. Furthermore, the first metal ion removal gas supply part 9A may be an apparatus connected to a first metal ion removal gas supply source.

The first metal solubilizer supply part 10A is configured to supply a first metal dissolution gas, which is an example of a first metal solubilizer dissolving crystals of a metal component deposited by crystallizing the first metal ions removed from the hard water, to the primary-side fine bubble generating part 3B. In the first embodiment, the first metal solubilizer supply part 10A is configured to supply "carbon dioxide ($CO_2$)" as the first metal dissolution gas to the primary-side fine bubble generating part 3B. The first metal solubilizer supply part 10A is disposed upstream of the primary-side separating apparatus 4 in the flow direction of the hard water so that the first metal solubilizer can be supplied to the primary-side separating apparatus 4. The first metal solubilizer supply part 10A may include a tank filled with the first metal solubilizer, for example. The first metal solubilizer supply part 10A may be an apparatus generating the first metal solubilizer. Furthermore, the first metal solubilizer supply part 10A may be an apparatus connected to a first metal solubilizer supply source.

The primary-side gas switching mechanism 11A is a mechanism switched to supply either the first metal ion removal gas or the first metal dissolution gas to the primary-side fine bubble generating part 3B. By switching the primary-side gas switching mechanism 11A, a softening treatment with the first metal ion removal gas and a regeneration treatment with the first metal dissolution gas can selectively be performed. The primary-side gas switching mechanism 11A is made up of one or more valves, for example. The switching operation of the primary-side gas switching mechanism 11A is controlled by the controller 8.

When the primary-side gas switching mechanism 11A is switched to supply the first metal ion removal gas, the primary-side fine bubble generating part 3B generates the fine bubbles containing the first metal ion removal gas. The fine bubbles remove the first metal ions from the hard water and separate the crystals of the metal component, and the hard water is thereby subjected to the softening treatment. The principle of the softening treatment will be described in detail later.

On the other hand, when the primary-side gas switching mechanism 11A is switched to supply the first metal dissolution gas, the primary-side fine bubble generating part 3B generates the fine bubbles containing the first metal dissolution gas. The fine bubbles can dissolve the crystals of the metal component adhering to the primary-side separating apparatus 4 to perform the regeneration treatment as described later. The principle of the regeneration treatment will be described in detail later.

The primary-side separating apparatus 4 is connected to the primary-side ion removing apparatus 3 via a connection flow path 3C disposed on an upper outer circumferential portion of the primary-side hard water storage part 3A. The primary-side separating apparatus 4 is an apparatus separating the crystals of the metal component deposited by crystallizing the first metal ions removed from the hard water by the primary-side ion removing apparatus 3. The primary-side ion removing apparatus 3 and the primary-side separating apparatus 4 can reduce the concentration (hardness) of the first metal ions in the hard water to a predetermined concentration or less.

In the first embodiment, the primary-side separating apparatus 4 is a cyclone-type centrifugal separating apparatus having a tapered inner circumferential surface 4Aa with a diameter decreasing downward and causing hard water to spirally flow downward along the inner circumferential surface 4Aa so that the crystals of the metal component are separated. In the first embodiment, the primary-side separating apparatus 4 includes a separating part 4A having the inner circumferential surface 4Aa and a crystal storage part 4B storing crystals of a metal component.

The connection flow path 3C is connected to the separating part 4A such that water having passed through the primary-side ion removing apparatus 3 is discharged in a direction eccentric from a central axis of the separating part 4A. Such an eccentric arrangement allows the water discharged into the separating part 4A to flow spirally downward along the inner circumferential surface 4Aa. The first metal ions having a large specific gravity removed from the hard water move toward the inner circumferential surface 4Aa due to centrifugal separation and are deposited as the crystals of the metal component in the vicinity of the inner circumferential surface 4Aa. A portion of the crystals adheres to the inner circumferential surface 4Aa.

The crystal storage part 4B is disposed below the separating part 4A. The crystal storage part 4B includes a discharge flow path 4Ba for discharging water containing the crystals of the metal component. The discharge flow path 4Ba is provided with an opening/closing valve 12A capable of opening and closing the discharge flow path 4Ba. The opening/closing operation of the opening/closing valve 12A is controlled by the controller 8. A discharge-side backflow prevention mechanism 13A is disposed on the discharge flow path 4Ba downstream of the opening/closing valve 12A in a discharge direction.

The discharge-side backflow prevention mechanism 13A is a mechanism preventing the crystals of the metal component from flowing back into the separating apparatus 4. The discharge-side backflow prevention mechanism 13A can prevent the crystals of the metal component from mixing again into treated water (soft water) obtained by separating the crystal of the metal component from hard water. The discharge-side backflow prevention mechanism 13A is made up of one or more check valves, for example. Alternatively, the discharge-side backflow prevention mechanism 13A may be made up of a vacuum breaker, for example. Furthermore, the discharge-side backflow prevention mechanism 13A may be configured to prevent backflow by a spout space disposed at an outlet of the discharge flow path 4Ba.

The separating part 4A of the primary-side separating apparatus 4 is connected to the secondary-side ion removing apparatus 5 via a connection flow path 14. The connection flow path 14 is a flow path for taking out from the primary-side separating apparatus 4 the treated water obtained by separating the crystals of the metal component. In the first embodiment, since the primary-side separating apparatus 4 is a cyclone-type centrifugal separating apparatus, the crystals of the metal component can be concentrated in the vicinity of the inner circumferential surface 4Aa. To prevent the crystals of the metal component from entering the connection flow path 14, the connection flow path 14 is connected to an upper central portion of the separating part 4A at a position distant from the inner circumferential surface 4Aa.

The connection flow path 14 is provided with a secondary-side pH adjustment apparatus 15B increasing the pH of the hard water from which the first metal ions are removed by the primary-side ion removing apparatus 3. In the first embodiment, the secondary-side pH adjustment apparatus 15B includes a secondary-side degassing apparatus removing carbon dioxide contained in the hard water from which the first metal ions are removed by the primary-side ion removing apparatus 3. In the first embodiment, the secondary-side pH adjustment apparatus 15B is configured to remove carbon dioxide contained in the hard water by spraying the hard water in a mist form in the air. The principle of increase in pH of hard water due to removal of carbon dioxide will be described later in detail. The drive of the secondary-side pH adjustment apparatus 15B is controlled by the controller 8.

The connection flow path 14 is connected to the secondary-side ion removing apparatus 5. The connection flow path 14 is a flow path for supplying the secondary-side ion removing apparatus 5 with the hard water from which the first metal ions are removed. In the first embodiment, a pump P2 is disposed in a connecting portion between the connection flow path 14 and the secondary-side ion removing apparatus 5. The pump P2 functions to cause the hard water flowing through the connection flow path 14 to flow through the secondary-side ion removing apparatus 5 to the secondary-side separating apparatus 6. The drive of the pump P2 is controlled by the controller 8.

The secondary-side ion removing apparatus 5 includes a secondary-side hard water storage part 5A storing the hard water having the pH increased by the secondary-side pH adjustment apparatus 15B and a secondary-side fine bubble generating part 5B generating and supplying fine bubbles to the secondary-side hard water storage part 5A. The secondary-side ion removing apparatus 5 is an apparatus causing fine bubbles to adsorb second metal ions in the hard water in the secondary-side hard water storage part 5A and thereby removing the second metal ions from the hard water. The secondary-side fine bubble generating part 5B is disposed downstream of the pump P2 in the flow direction of the hard water so as to prevent gas from entering the pump P2.

In the first embodiment, the second metal ions are magnesium ions ($Mg^{2+}$). A second metal ion removal gas supply part 9B and a second metal solubilizer supply part 10B are connected via a secondary-side gas switching mechanism 11B to the secondary-side fine bubble generating part 5B.

The second metal ion removal gas supply part 9B is configured to supply a second metal ion removal gas for removing the second metal ions in the hard water to the secondary-side fine bubble generating part 5B. In the first embodiment, the second metal ion removal gas supply part 9B is configured to supply "air" as the second metal ion removal gas to the secondary-side fine bubble generating part 5B. The second metal ion removal gas supply part 9B may include a tank filled with the second metal ion removal gas, for example. The second metal ion removal gas supply part 9B may be an apparatus generating the second metal ion removal gas. Furthermore, the second metal ion removal gas supply part 9B may be an apparatus connected to a second metal ion removal gas supply source.

The second metal solubilizer supply part 103 is configured to supply a second metal dissolution gas, which is an example of a second metal solubilizer dissolving crystals of a metal component deposited by crystallizing the second metal ions removed from the hard water, to the secondary-side fine bubble generating part 5B. In the first embodiment, the second metal solubilizer supply part 10B is configured to supply "carbon dioxide ($CO_2$)" as the second metal dissolution gas to the secondary-side fine bubble generating part 5B. The second metal solubilizer supply part 10B is arranged upstream of the secondary-side separating apparatus 6 in the flow direction of the hard water so that the second metal solubilizer can be supplied to the secondary-side separating apparatus 6. The second metal solubilizer supply part 10B may include a tank filled with the second metal solubilizer, for example. The second metal solubilizer supply part 10B may be an apparatus generating the second metal solubilizer. Furthermore, the second metal solubilizer supply part 10B may be an apparatus connected to a second metal solubilizer supply source.

The secondary-side gas switching mechanism 11B is a mechanism switched to supply either the second metal ion removal gas or the second metal dissolution gas to the secondary-side fine bubble generating part 5B. By switching the secondary-side gas switching mechanism 11B, a softening treatment with the second metal ion removal gas and a regeneration treatment with the second metal dissolution gas can selectively be performed. The secondary-side gas switching mechanism 11B is made up of one or more valves, for example. The switching operation of the secondary-side gas switching mechanism 11B is controlled by the controller 8.

When the secondary-side gas switching mechanism 11B is switched to supply the second metal ion removal gas, the secondary-side fine bubble generating part 5B generates the fine bubbles containing the second metal ion removal gas. The fine bubbles remove the second metal ions from the hard water and separate the crystals of the metal component, and the hard water is thereby subjected to the softening treatment.

On the other hand, when the secondary-side gas switching mechanism 11B is switched to supply the second metal dissolution gas, the secondary-side fine bubble generating part 5B generates the fine bubbles containing the second metal dissolution gas. The fine bubbles can dissolve the crystals of the metal component adhering to the secondary-side separating apparatus 6 to perform the regeneration treatment as described later.

The secondary-side separating apparatus 6 is connected to the secondary-side ion removing apparatus 5 via a connection flow path 5C disposed on an upper outer circumferential portion of the secondary-side hard water storage part 5A. The secondary-side separating apparatus 6 is an apparatus separating the crystals of the metal component deposited by crystallizing the second metal ions removed from the hard water by the secondary-side ion removing apparatus 5. The secondary-side ion removing apparatus 5 and the secondary-side separating apparatus 6 can reduce the concentration (hardness) of the second metal ions in the hard water to a predetermined concentration or less to produce soft water. For the definition of hard water and soft water, for example, the definition of WHO may be used. Specifically, the soft water may be defined as water having a hardness of less than 120 mg/L, and the hard water may be defined as water having a hardness of 120 mg/L or more.

In the first embodiment, the secondary-side separating apparatus 6 is a cyclone-type centrifugal separating apparatus having a tapered inner circumferential surface 6Aa with a diameter decreasing downward and causing hard water to spirally flow downward along the inner circumferential surface 6Aa so that the crystals of the metal component are separated. In the first embodiment, the secondary-side separating apparatus 6 includes a separating part 6A having the inner circumferential surface 6Aa and a crystal storage part 6B storing crystals of a metal component.

The connection flow path 5C is connected to the separating part 6A such that water having passed through the secondary-side ion removing apparatus 5 is discharged in a direction eccentric from a central axis of the separating part 6A. Such an eccentric arrangement allows the water discharged into the separating part 6A to flow spirally downward along the inner circumferential surface 6Aa. The second metal ions having a large specific gravity removed from the hard water move toward the inner circumferential surface 6Aa due to centrifugal separation and are deposited as the crystals of the metal component in the vicinity of the inner circumferential surface 6Aa. A portion of the crystals adheres to the inner circumferential surface 6Aa.

The crystal storage part 6B is disposed below the separating part 6A. The crystal storage part 6B includes a discharge flow path 6Ba for discharging water containing the crystals of the metal component. The discharge flow path 6Ba is provided with an opening/closing valve 12B capable of opening and closing the discharge flow path 6Ba. The opening/closing operation of the opening/closing valve 12B is controlled by the controller 8. A discharge-side backflow prevention mechanism 13B is disposed on the discharge flow path 6Ba downstream of the opening/closing valve 12B in a discharge direction.

The discharge-side backflow prevention mechanism 13B is a mechanism preventing the crystals of the metal component from flowing back into the secondary-side separating apparatus 6. The discharge-side backflow prevention mechanism 13B can prevent the crystals of the metal component from mixing again into treated water (soft water) obtained by separating the crystal of the metal component from hard water. The discharge-side backflow prevention mechanism 13B is made up of one or more check valves, for example. Alternatively, the discharge-side backflow prevention mechanism 13B may be made up of a vacuum breaker, for example. Furthermore, the discharge-side backflow prevention mechanism 13B may be configured to prevent backflow by a spout space disposed at an outlet of the discharge flow path 6Ba.

The secondary-side flow path 7 is connected to the secondary-side separating apparatus 6. The secondary-side flow path 7 is a flow path for taking out from the secondary-side separating apparatus 6 the treated water obtained by separating the crystals of the metal component. In the first embodiment, since the secondary-side separating apparatus 6 is a cyclone-type centrifugal separating apparatus, the crystals of the metal component can be concentrated in the vicinity of the inner circumferential surface 6Aa. To prevent the crystals of the metal component from entering the secondary-side connection flow path 7, the secondary-side connection flow path 7 is connected to an upper central portion of the separating part 6A at a position distant from the inner circumferential surface 6Aa.

The primary-side flow path 2 is provided with a supply-side backflow prevention mechanism 16. The supply-side backflow prevention mechanism 16 is a mechanism preventing the fine bubbles and the treated water from flowing back to the hard water supply side. The supply-side backflow prevention mechanism 16 is made up of one or more check valves, for example.

For example, when maintenance is required due to a failure of the primary-side ion removing apparatus 3 or the secondary-side ion removing apparatus 5, water cannot be used during the maintenance. Therefore, in the first embodiment, the primary-side flow path 2 and the secondary-side flow path 7 are connected by a bypass flow path 17. The ion removing system 1 includes a flow switching mechanism switching the flow direction of the hard water flowing through the primary-side flow path 2 to either the primary-side ion removing apparatus 3 or the bypass flow path 17. Since the flow switching mechanism can be switched to cause the hard water flowing through the primary-side flow path 2 to flow through the bypass flow path 17 to the secondary-side flow path 7, the hard water can be used even during maintenance. Even not during maintenance, the flow switching mechanism can be switched to selectively use the hard water and the treated water (soft water).

In the first embodiment, the flow switching mechanism includes a first valve 18A capable of opening and closing the primary-side flow path 2, a second valve 18B capable of opening and closing the secondary-side flow path 7, and a third valve 18C capable of opening and closing the bypass flow path 17. The opening/closing operations of the first valve 18A, the second valve 18B, and the third valve 18C are controlled by the controller 8.

The controller 8 is configured to selectively provide a first control of opening the first valve 18A and the second valve 18B and closing the third valve 18C, and a second control of closing the first valve 18A and the second valve 18B and opening the third valve 18C. When the controller 8 provides the first control, the hard water flowing through the primary-side flow path 2 flows to the primary-side ion removing apparatus 3, the connection flow path 14, and the secondary-side ion removing apparatus 5 and is subjected to the softening treatment before flowing into the secondary-side flow path 7. As a result, the treated water (soft water) is discharged to an outlet of the secondary-side flow path 7. When the controller 8 provides the second control, the hard water flowing through the primary-side flow path 2 flows through the bypass flow path 17 into the secondary-side flow path 7. As a result, the hard water is discharged to the outlet of the secondary-side flow path 7. Therefore, the controller 8 can provide the first control or the second control to selectively discharge the hard water or the treated water (soft water) from the outlet of the secondary-side flow path 7.

<Increase in pH Due to Degassing>

The principle of increase in pH of hard water due to removal of carbon dioxide from hard water will be described in more detail.

Figure 2:
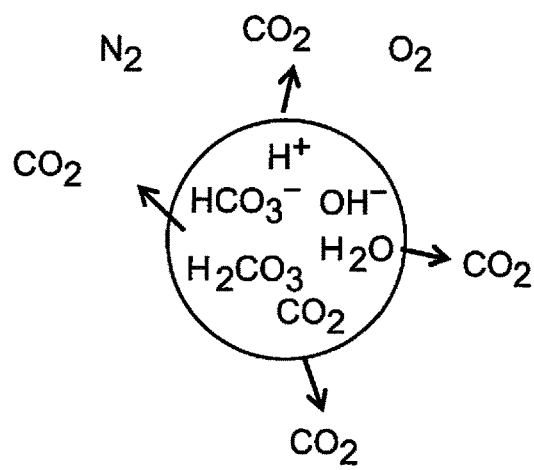
FIG. 2 is a schematic for explaining a hypothetical principle of removal of carbon dioxide by the ion removing system according to the first embodiment.

As shown in FIG. 2, hard water contains at least $H^+$ (hydrogen ions), $OH^-$ (hydroxide ions), $CO_2$ (carbon dioxide), $H_2CO_3$ (hydrogen carbonate), $HCO_3^-$ (hydrogen carbonate ions), and $H_2O$ (water). When hard water is sprayed in a mist form, the surface area of the hard water coming into contact with air increases, so that $CO_2$ contained in the hard water is released into the air. As a result, $CO_2$ in the hard water is reduced.

To compensate for the reduced $CO_2$, $H_2CO_3$ in the hard water changes into $CO_2$ and $H_2O$ due to a buffering action. As a result, $H_2CO_3$ in the hard water is reduced. This is represented by a specific chemical formula as in Formula 1 below.

$$H_2CO_3 \rightarrow CO_2 + H_2O \qquad \text{(Formula 1)}$$

To compensate for the reduced $H_2CO_3$, $HCO_3^-$ in the hard water binds to $H^+$ due to a buffering action and changes into $H_2CO_3$. This is represented by a specific chemical formula as in Formula 2 below.

$$HCO_3^- + H^+ \rightarrow H_2CO_3 \qquad \text{(Formula 2)}$$

At this point, the pH of the hard water increases due to consumption of $H^+$. The buffering action as described above is repeated until an equilibrium state is reached. This degassing treatment can increase the pH of the hard water to about 8.5, for example.

<Softening Treatment>

The principle of the softening treatment using fine bubbles will be described in more detail.

It is presumed that supplying fine bubbles containing air into hard water causes actions described in the following sections (1), (2), (3), and (4) on the first and second metal ions in the hard water. Specifically, it is presumed that the first and second metal ions in the hard water can be adsorbed to the fine bubbles and that the adsorbed first and second metal ions can be crystallized to remove crystals of metal components from the hard water. More specifically, the principle will be described as follows. It is noted that the present disclosure is not bound to the specific principles described in the following sections (1), (2), (3), and (4).

(1) Adsorption of First Metal Ions

Figure 3:
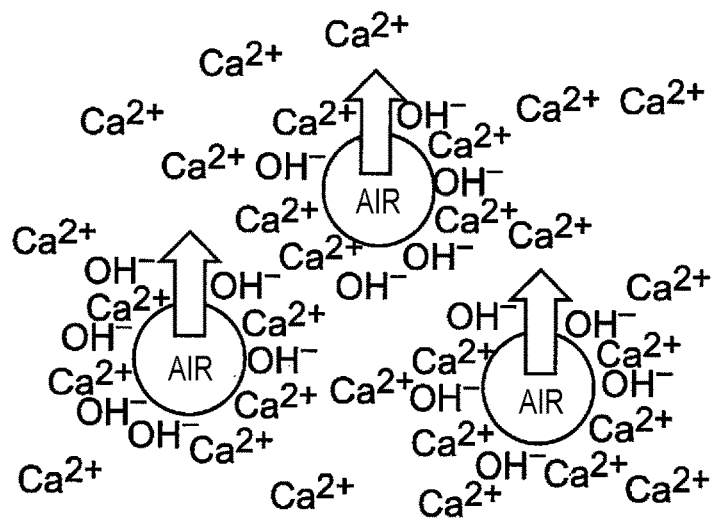
FIG. 3 is a schematic for explaining a hypothetical principle of adsorption of metal ions by the ion removing system according to the first embodiment.

As shown in FIG. 3, when the fine bubbles containing air are supplied into the hard water, $H^+$ (hydrogen ions) and $OH^-$ (hydroxide ions) are mixed on surfaces of the fine bubbles, and $H^+$ is positively charged, while $OH^-$ is negatively charged (only $OH^-$ is shown in FIG. 3). On the other hand, the hard water has $Ca^{2+}$ and $Mg^{2+}$ present as the positively charged first and second metal ions.

$Ca^{2+}$ has a positive charge and a higher ionization tendency than $Mg^{2+}$ and is therefore adsorbed in preference to $Mg^{2+}$ by $OH^-$ present on the surfaces of the fine bubbles due to an action of an intermolecular force (interionic interaction). $Ca^{2+}$ can be adsorbed to the fine bubbles in this way. Although $H^+$ repelling $Ca^{2+}$ is present on the surfaces of the fine bubbles, it is probable that $OH^-$ acts in preference to $H^+$ and adsorbs $Ca^{2+}$. The adsorption of $Ca^{2+}$ is mainly performed in the primary-side ion removing apparatus 3.

(2) Crystallization of First Metal Ions

Figure 4:
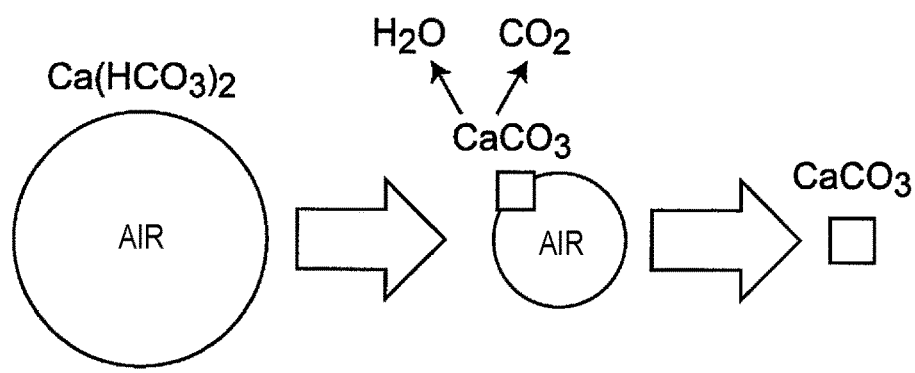
FIG. 4 is a schematic for explaining a hypothetical principle of crystallization of metal ions by the ion removing system according to the first embodiment.

In addition to the reaction shown in FIG. 3, a reaction shown in FIG. 4 is promoted by supplying the fine bubbles containing air into the hard water. Specifically, unlike ordinary bubbles, the fine bubbles supplied into the hard water hardly float to the surface, dissolve into the hard water, and therefore gradually shrink as shown in FIG. 4 due to an increase in surface tension. As described above, $Ca^{2+}$ is adsorbed on the surfaces of the fine bubbles. More specifically, $Ca^{2+}$ is present as calcium ions of soluble $Ca(HCO_3)_2$ (calcium hydrogencarbonate). As the fine bubbles gradually shrink, the dissolved concentration of $Ca^{2+}$ on the surfaces of the fine bubbles increases. The increase in the dissolved concentration results in a supersaturation state at a certain point, and $Ca^{2+}$ is crystallized and deposited. This is represented by a specific chemical formula as in Formula 3 below.

$$Ca(HCO_3)_2 \rightarrow CaCO_3 + CO_2 + H_2O \quad \text{(Formula 3)}$$

$CaCO_3$ (calcium carbonate) is insoluble (water-insoluble) and is therefore deposited as crystals of a metal component. As a result, those dissolved as $Ca^{2+}$ of $Ca(HCO_3)_2$ are deposited as crystals of the metal component. By promoting such a reaction, $CaCO_3$ deposited by crystallizing $Ca^{2+}$ can be separated from the hard water. The crystallization of $Ca^{2+}$ is mainly performed in the separating part 4A of the primary-side separating apparatus 4.

Although a reaction may occur in the reverse direction of Formula 3 in the same water, it is presumed that the reaction in the direction of Formula 3 is preferentially performed in the equilibrium relationship by continuously supplying the fine bubbles.

In the first embodiment, since the separating apparatus 4 is a cyclone-type centrifugal separating apparatus, the crystals of the metal component are deposited in the vicinity of the inner circumferential surface 4Aa of the separating part 4A and stored in the crystal storage part 4B. The crystals of the metal component stored in the crystal storage part 4B are discharged through the discharge flow path 4Ba by opening the opening/closing valve 12A. By separating the crystals of the metal component from inside the hard water in this way, the hard water can be softened.

(3) Adsorption of Second Metal Ions

As $Ca^{2+}$ is removed from the hard water, the negative charges present on the surfaces of the fine bubbles decrease, and the pH of the hard water is reduced. In this regard, in the first embodiment, the pH of the hard water with $Ca^{2+}$ removed is increased by the secondary-side pH adjustment apparatus 15B. Positively charged $Mg^{2+}$ is present in the hard water with $Ca^{2+}$ removed. As the pH of the hard water rises, negatively charged $OH^-$ present on the surfaces of the fine bubbles increases. As a result, positively charged $Mg^{2+}$ is more easily adsorbed to the fine bubbles. Consequently, an amount of $Mg^{2+}$ adsorbed to the fine bubbles can be increased, and the crystallization of the metal ions can be promoted as described later. Although W repelling $Mg^{2+}$ is present on the surfaces of the fine bubbles, it is probable that $OH^-$ acts in preference to $H^+$ and adsorbs $Mg^{2+}$. The adsorption of $Mg^{2+}$ is mainly performed in the secondary-side ion removing apparatus 5.

(4) Crystallization of Second Metal Ions

As described above, unlike ordinary bubbles, the fine bubbles supplied into the hard water hardly float to the surface, dissolve into the hard water, and therefore gradually shrink due to an increase in surface tension. As described above, $Mg^{2+}$ is adsorbed on the surfaces of the fine bubbles. More specifically, $Mg^{2+}$ is present as magnesium ions of soluble $Mg(HCO_3)_2$ (magnesium hydrogen carbonate). As the fine bubbles gradually shrink, the dissolved concentration of $Mg^{2+}$ on the surfaces of the fine bubbles increases. The increase in the dissolved concentration results in a supersaturation state at a certain point, and $Mg^{2+}$ is crystallized and deposited. This is represented by a specific chemical formula as in Formula 4 below.

$$Mg(HCO_3)_2 \rightarrow MgCO_3 + CO_2 + H_2O \quad \text{(Formula 4)}$$

$MgCO_3$ (magnesium carbonate) is insoluble (water-insoluble) and is therefore deposited as crystals of a metal component. As a result, those dissolved as $Mg^{2+}$ of $Mg(HCO_3)_2$ are deposited as crystals of the metal component. By promoting such a reaction, $MgCO_3$ deposited by crystallizing the second metal ions $Mg^{2+}$ can be separated from the hard water. The crystallization of $Mg^{2+}$ is mainly performed in the separating part 6A of the secondary-side separating apparatus 6.

Although a reaction may occur in the reverse direction of Formula 4 in the same water, it is presumed that the reaction in the direction of Formula 4 is preferentially performed in the equilibrium relationship by continuously supplying the fine bubbles.

<Regeneration Treatment>

The principle of the regeneration treatment using fine bubbles will be described in more detail.

By performing the softening treatment, a portion of $CaCO_3$ deposited by crystallizing the first metal ions adheres to the inner circumferential surface 4Aa of the separating part 4A. The regeneration treatment is performed as a treatment for returning $CaCO_3$ to $Ca(HCO_3)_2$. Specifically, the primary-side fine bubble generating part 3B generates fine bubbles containing carbon dioxide, which is a gas different from that used during the softening treatment.

Figure 5:
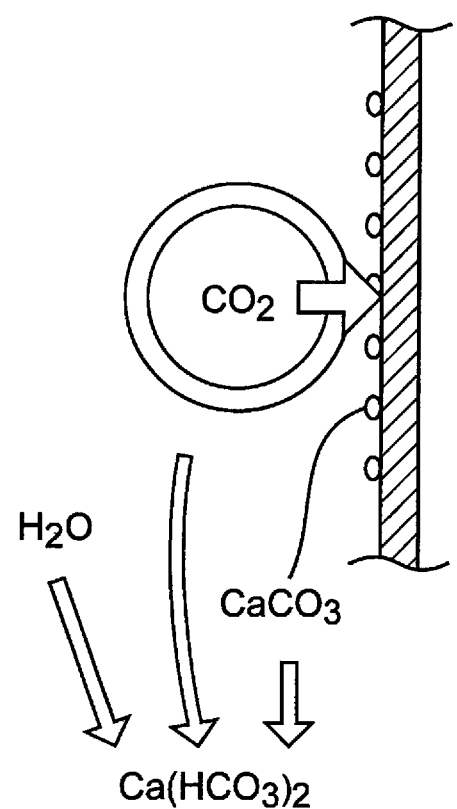
FIG. 5 is a schematic for explaining a hypothetical principle of a regeneration treatment by the ion removing system according to the first embodiment.

As shown in FIG. 5, by supplying the fine bubbles of carbon dioxide to $CaCO_3$ adhering to the inner circumferential surface 4Aa of the separating part 4A, the following reaction is promoted.

$$CaCO_3 + CO_2 + H_2O \rightarrow Ca(HCO_3)_2 \quad \text{(Formula 5)}$$

The reaction generates soluble (water-soluble) $Ca(HCO_3)_2$ from insoluble $CaCO_3$. $Ca(HCO_3)_2$ dissolves into water and moves to the crystal storage part 4B. The $Ca(HCO_3)_2$ having moved to the crystal storage part 4B is discharged through the discharge flow path 4Ba by opening the opening/closing valve 12A. As a result, the insoluble $CaCO_3$ adhering to the inner circumferential surface 4Aa of the separating part 4A can be discharged to the outside to restore the original state. Subsequently, the softening treatment described above can be performed again.

By performing the softening treatment, a portion of $MgCO_3$ deposited by crystallizing the second metal ions adheres to the inner circumferential surface 6Aa of the separating part 6A. The regeneration treatment is performed as a treatment for returning $MgCO_3$ to $Mg(HCO_3)_2$. Specifically, the secondary-side fine bubble generating part 5B generates fine bubbles containing carbon dioxide, which is a gas different from that used during the softening treatment.

By supplying the fine bubbles of carbon dioxide to $MgCO_3$ adhering to the inner circumferential surface 6Aa of the separating part 6A, the following reaction is promoted.

$$MgCO_3 + CO_2 + H_2O \rightarrow Mg(HCO_3)_2 \quad \text{(Formula 6)}$$

The reaction generates soluble (water-soluble) $Mg(HCO_3)_2$ from insoluble $MgCO_3$. $Mg(HCO_3)_2$ dissolves into water and moves to the crystal storage part 6B. The $Mg(HCO_3)_2$ having moved to the crystal storage part 6B is discharged through the discharge flow path 6Ba by opening the opening/closing valve 12B. As a result, the insoluble $MgCO_3$ adhering to the inner circumferential surface 6Aa of the separating part 6A can be discharged to the outside to restore the original state. Subsequently, the softening treatment described above can be performed again.

As described above, when the first and second metal ions are removed from hard water by using an ion exchange resin, a large amount of salt water is required for regenerating the ion exchange resin. In this regard, the ion removing system 1 of the first embodiment removes the first and second metal ions from the hard water by using the fine bubbles and therefore can eliminate the need for a large amount of salt water required for regenerating the ion exchange resin. This can simplify the regeneration treatment to make the maintenance easier. Additionally, since regeneration wastewater containing salt water is not generated, soil pollution and a load on sewage treatment can be suppressed to improve environmental properties. Furthermore, concentration of sodium ions is not increased in treated water, so that the generated treated water can be used as drinking water.

Figure 6:
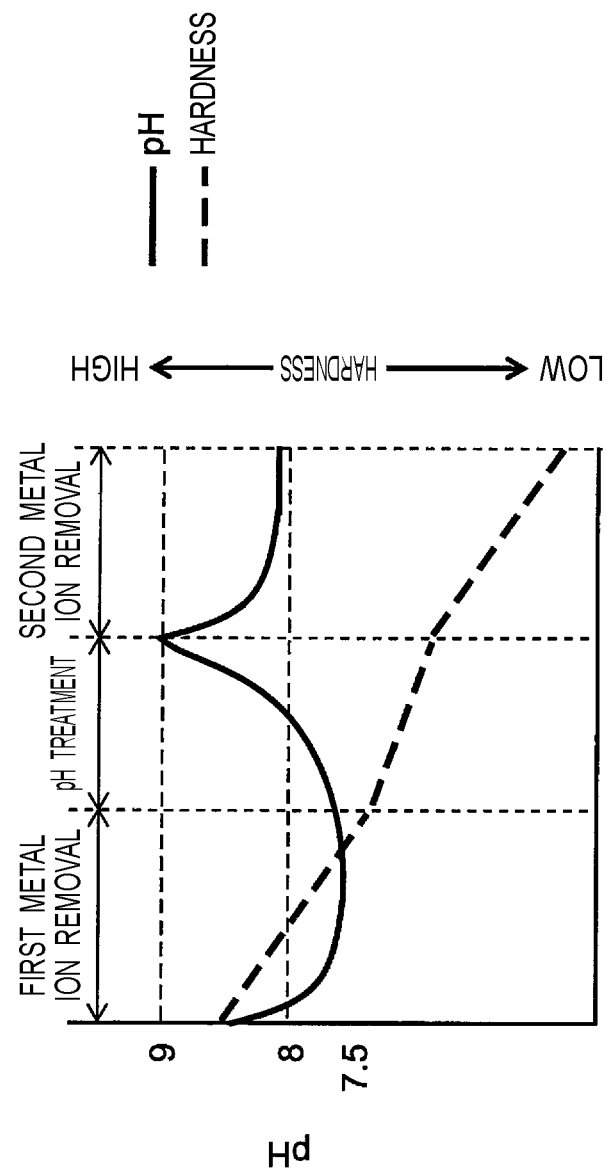
FIG. 6 is a graph schematically showing changes in pH and hardness of hard water flowing through the ion removing system according to the first embodiment.

FIG. 6 is a graph schematically showing changes in pH and hardness of hard water flowing through the ion removing system 1 according to the first embodiment. As shown in FIG. 6, as the primary-side ion removing apparatus 3 removes the first metal ions from the hard water, the hardness of the hard water decreases, and the pH also decreases. Subsequently, the pH of the hard water is increased (subjected to a pH treatment) by the secondary-side PH adjustment apparatus 15B. As a result, the hardness of the hard water slightly decreases due to an increase in the pH of the hard water. Subsequently, as the secondary-side ion removing apparatus 5 removes the second metal ions from the hard water having the increased pH, the hardness of the hard water further decreases, and the pH of the hard water also decreases.

According to the ion removing system 1 of the first embodiment, the pH of the hard water with the first metal ions removed is increased by the secondary-side pH adjustment apparatus 15B to increase the power of adsorption of the second metal ions (e.g., magnesium ions) by the fine bubbles, so that the removal efficiency of the second metal ions can be improved. Additionally, since the second metal ions are removed from the hard water from which the first metal ions are removed, it is not necessary to increase the pH to a level required for removing both the first metal ions and the second metal ions, and the pH may be increased to a level required for removing the second metal ions. This can prevent the pH of the hard water from having a value unsuitable for drinking water.

In the above description, for convenience of description, the second metal ions are removed after the first metal ions are completely removed; however, in reality, when the first metal ions are removed, the second metal ions may also be removed. Additionally, the first metal ions may remain when the second metal ions are removed, so that both the first metal ions and the second metal ions may be removed. As used herein, "removing the first metal ions" means "mainly removing the first metal ions", and "removing the second metal ions" means "mainly removing the second metal ions".

Experimental Example 1

Experimental Example 1 performed to confirm the principle of pH increase due to degassing will be described. Experiments were conducted by using an apparatus shown in FIG. 7.

Figure 7:
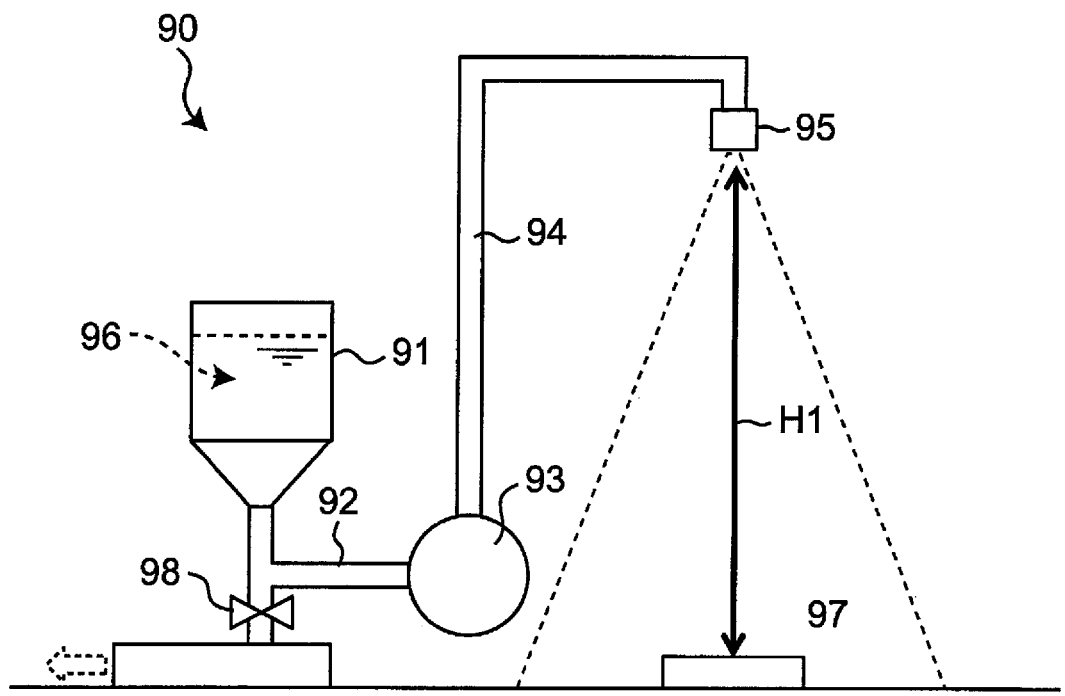
FIG. 7 is a diagram showing a schematic configuration of an apparatus used in Experimental Example 1.

FIG. 7 is a diagram showing a schematic configuration of an apparatus 90 used in Experimental Example 1.

As shown in FIG. 7, the apparatus 90 includes a water tank 91, a first piping 92, a pump 93, a second piping 94, and a mist nozzle 95.

The water tank 91 is a water tank storing a hard water 96. The water tank 91 is connected to the pump 93 via the first piping 92. The pump 93 is connected to the mist nozzle 95 via the second piping 94. The mist nozzle 95 is disposed at a position separated upward from a sample 97 by a mist distance H1. The pump 93 is a pump pumping the hard water 96 to the mist nozzle 95. The mist nozzle 95 is a nozzle spraying the hard water supplied via the second piping 94 toward the sample 97 in a mist form. Remaining water remaining in the water tank 91 is drained to the outside by opening an opening/closing valve 98 disposed in the first piping 92.

Figure 8:
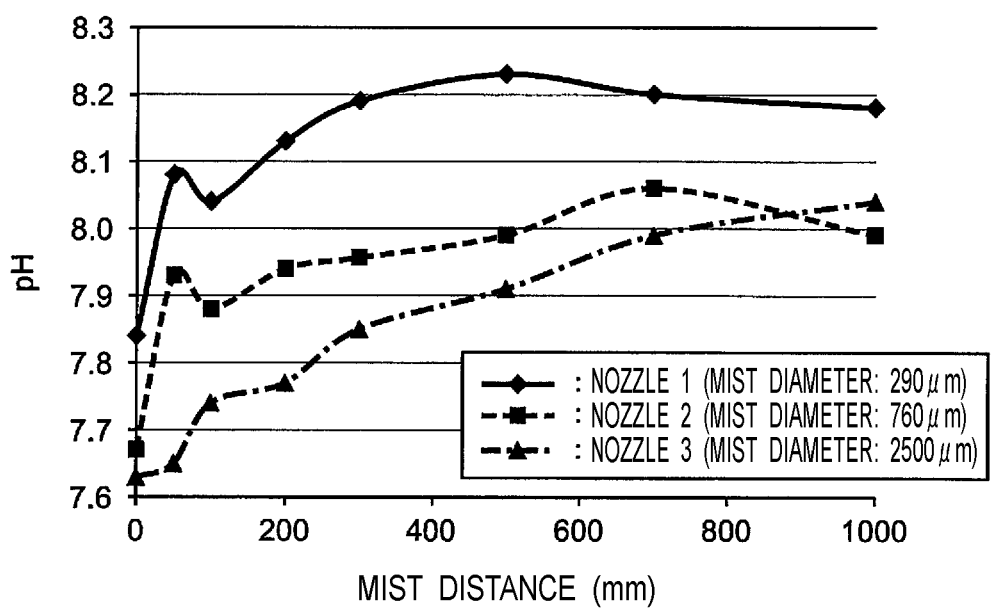
FIG. 8 is a graph showing results of Experimental Example 1.

FIG. 8 is a graph showing results of Experimental Example 1. In this example, three nozzles 1, 2, 3 different in sprayed mist diameter (average outer diameter of mist droplets) were used as the mist nozzle 95. Specifically, the nozzle 1 is a nozzle spraying a mist having a mist diameter of 290 μm at an instantaneous flow rate of 1.3 L/min. The nozzle 2 is a nozzle spraying a mist having a mist diameter of 760 μm at an instantaneous flow rate of 4.2 L/min. The nozzle 3 is a nozzle spraying a mist having a mist diameter of 2500 μm at an instantaneous flow rate of 0.2 L/min.

In FIG. 8, the horizontal axis represents the mist distance H1 (mm), and the vertical axis represents the pH of the hard water 96. As shown in FIG. 7, it was confirmed that as the mist diameter becomes smaller, i.e., as the specific surface area becomes larger, the pH of the hard water 96 is more increased. It was also confirmed that as the mist distance H1 becomes longer, the pH of the hard water 96 is basically increased since the contact time of the hard water 96 with the air becomes longer.

Experimental Example 2

Experimental Example 2 performed to confirm the principle of the softening treatment using fine bubbles will be described. Experiments were conducted by using an apparatus 20 shown in FIGS. 9A and 9B.

Figure 9A:
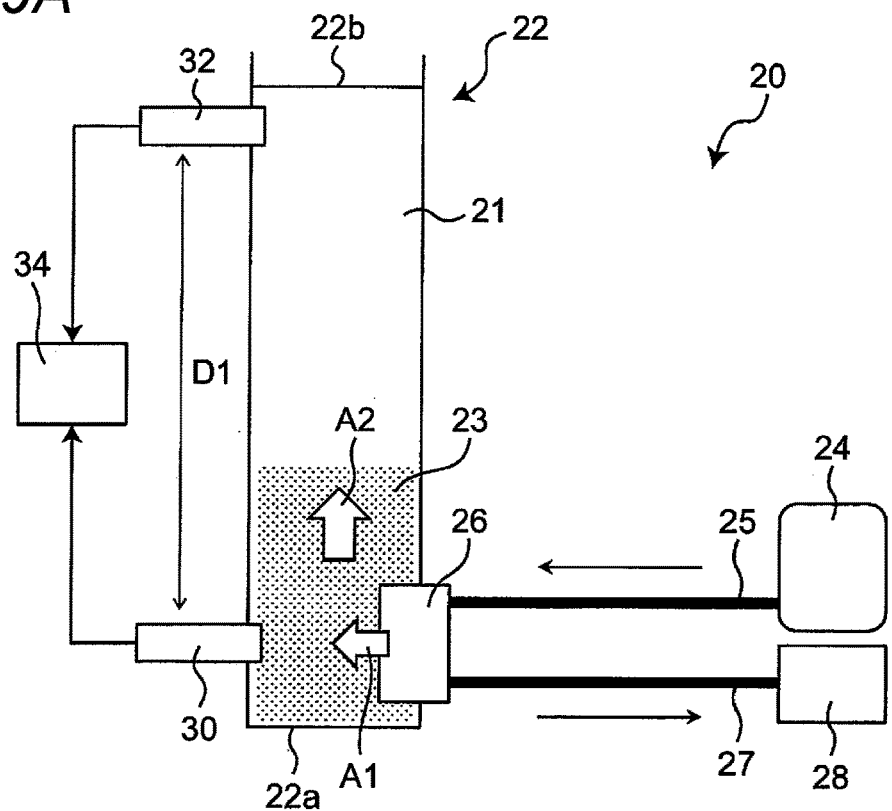
FIG. 9A is a diagram showing a schematic configuration of an apparatus used in Experimental Example 2, showing a state after a predetermined time has elapsed from generation of fine bubbles.
Figure 9B:
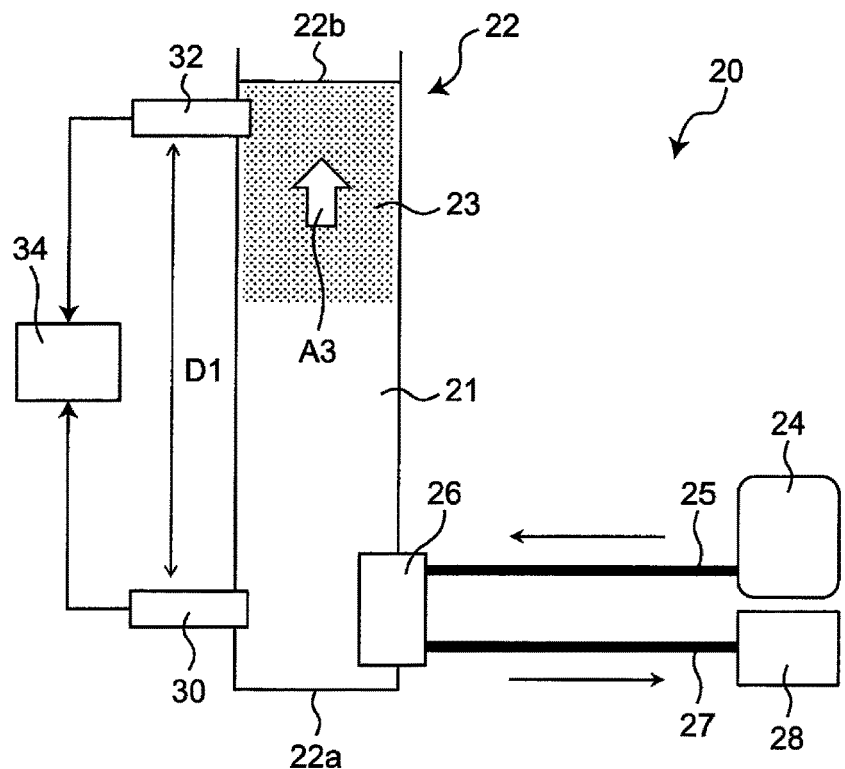
FIG. 9B is a diagram showing the schematic configuration of the apparatus used in Experimental Example 2, showing a state after a predetermined time has further elapsed from the state shown in FIG. 9A.

FIGS. 9A and 9B are diagrams showing a schematic configuration of the apparatus 20 used in Experimental Example 2. FIG. 9A shows a state after a predetermined time has elapsed (specifically, after 15 seconds have elapsed) from generation of fine bubbles, and FIG. 9B shows a state after a predetermined time has further elapsed (specifically, after 45 seconds have elapsed) from the state shown in FIG. 9A. The state of FIG. 9A corresponds to a state when the elapsed time from the generation of fine bubbles is 15 seconds in FIG. 10, and the state of FIG. 9B corresponds to a state when the elapsed time from the generation of fine bubbles is 60 seconds in FIG. 10.

The apparatus 20 shown in FIGS. 9A and 9B is an experimental apparatus capable of supplying fine bubbles 23 from the bottom surface side in a water tank 22 (hard water storage part) storing a hard water 21. In the apparatus 20, the concentration of metal ions in the hard water 21 can be measured at two positions on the bottom surface side and the water surface side. When the apparatus 20 as described above was used to supply the fine bubbles 23 into the water tank 22 and concentration transitions of metal ions were detected on the bottom surface side and the water surface side, results shown in FIG. 10 were obtained.

Figure 10:
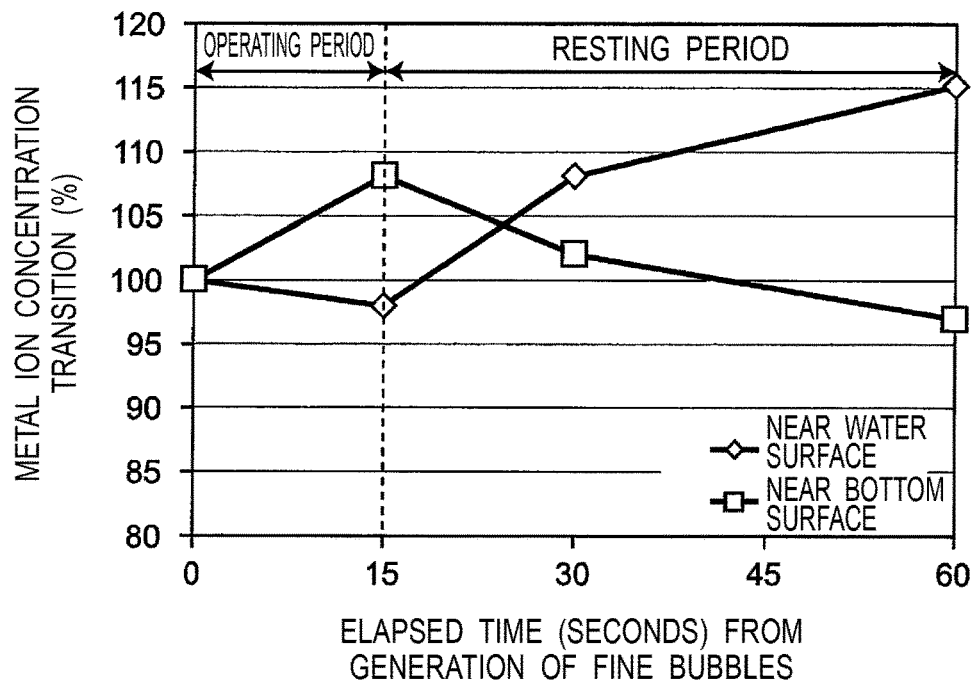
FIG. 10 is a diagram showing a result of Experimental Example 2.

From the results shown in FIG. 10, the effect of "adsorption of metal ions by fine bubbles" described above was demonstrated. Specific results will be described later.

As shown in FIGS. 9A and 9B, the apparatus 20 includes the water tank 22, a gas supply part 24, a first piping 25, a fine bubble generating part 26, a second piping 27, a pump 28, a first water intake part 30, a second water intake part 32, and a metal ion concentration detector 34.

The water tank 22 is a water tank storing the hard water 21. In the example shown in FIGS. 9A and 9B, the water tank 22 is configured as a tank elongated in a vertical direction. The gas supply part 24 is a member supplying a gas to the fine bubble generating part 26 via the first piping 25. The fine bubble generating part 26 is an apparatus generating the fine bubbles 23 from the gas supplied from the gas supply part 24. The fine bubble generating part 26 corresponds to the primary-side fine bubble generating part 3B and the secondary-side fine bubble generating part 5B described above. The gas is supplied from the gas supply part 24 to the fine bubble generating part 26 due to an action of negative pressure from the pump 28 via the second piping 27.

The first water intake part 30 is a member taking sample water of the hard water 21 from near a bottom surface 22a of the water tank 22. The second water intake part 32 is a member taking sample water from near a water surface 22b of the water tank 22. The height positions of the first water intake part 30 and the second water intake part 32 may be set to any positions, and a distance D1 from the first water intake part 30 to the second water intake part 32 can be adjusted to a desired value.

In the example shown in FIGS. 9A and 9B, the height position of the first water intake part 30 is set to substantially the same position as the height position where the fine bubble generating part 26 generates the fine bubbles 23.

The metal ion concentration detector 34 is a member detecting the concentration of metal ions in the sample water taken from the first water intake part 30 and the second water intake part 32.

When the fine bubble generating part 26 and the pump 28 are operated in the configuration, the gas is sent from the gas supply part 24 via the first piping 25 to the fine bubble generating part 26 due to the action of negative pressure from the pump 28 via the second piping 27. The fine bubble generating part 26 uses this gas as a raw material to generate and supply the fine bubbles 23 to the water tank 22 (arrow A1 of FIG. 9A).

The fine bubble generating part 26 and the pump 28 are operated for a predetermined period (15 seconds in Experimental Example 2) to continuously generate the fine bubble 23.

Subsequently, the operation of the fine bubble generating part 26 and the pump 28 is stopped. The stop of the operation is followed by a predetermined resting period (45 seconds in Experimental Example 2).

As shown in FIG. 9A, at the end of the operating period (after 15 seconds from the generation of the fine bubbles), it was visually confirmed that the fine bubbles 23 supplied into the water tank 22 moved upward in the hard water 21 (arrow A2) and were retained in a lower portion of the water tank 22.

As shown in FIG. 9B, at the end of the resting period (after 60 seconds from the generation of fine bubbles), it was visually confirmed that the fine bubbles 23 supplied into the hard water 21 further moved upward to reach the water surface 22b (arrow A3) and were retained in an upper portion of the water tank 22.

The sample water was extracted from the first water intake part 30 and the second water intake part 32 at a predetermined timing during the operation to measure the metal ion concentration with the metal ion concentration detector 34, and the results are shown in FIG. 6.

Specific experimental conditions related to the results of FIG. 10 are listed below.

Experimental Conditions

Type of gas supplied by the gas supply part 24: air
Hardness of the hard water 21: about 300 mg/L
Temperature of the hard water 21: 25° C.
Distance D1 from the first water intake part 30 to the second water intake part 32: about 1 m
Operating period of the fine bubble generating part 26 and the pump 28: 15 seconds
Resting period of the fine bubble generating part 26 and the pump 28: 45 seconds
Metal ion concentration detector 34: LAQUA F-70 manufactured by HORIBA, Ltd.
Metal ion to be measured: $Ca^{2+}$
Sample water extraction timing: after 0 seconds, 15 seconds, 30 seconds, 60 seconds from the start of operation In FIG. 10, the horizontal axis represents an elapsed time (seconds) from the generation of fine bubbles, and the vertical axis represents a concentration transition (%) of metal ions ($Ca^{2+}$) detected by the metal ion concentration detector 34. The concentration transition of the metal ions represents the transition of the metal ion concentration when the metal ion concentration measured at the start of operation is 100%.

As shown in FIG. 10, the concentration in the sample water extracted from the first water intake part 30 near the bottom surface 22a of the water tank 22 increases to about 108% when 15 seconds have elapsed. During the subsequent resting period, the concentration gradually decreases and finally decreases to about 97%.

On the other hand, the concentration in the sample water extracted from the second water intake part 32 near the water surface 22b of the water tank 22 is maintained at nearly 100% until 15 seconds have elapsed, then gradually increases during the resting period, and finally increases to about 115%.

The results of the concentration transitions of the metal ions and the behavior of the fine bubbles 23 are associated with each other as follows.

When 15 seconds have elapsed as shown in FIG. 9A, the metal ion concentration is increased in the sample water of the first water intake part 30 in which the fine bubbles 23 are retained. On the other hand, the metal ion concentration is almost not changed in the sample water of the second water intake part 32 in which the fine bubbles 23 are not retained.

When 60 seconds have elapsed as shown in FIG. 9B, the metal ion concentration is reduced to a little less than 100% in the sample water of the first water intake part 30 in which the fine bubbles 23 are not retained. On the other hand, the metal ion concentration is significantly increased in the sample water of the second water intake part 32 in which the fine bubbles 23 are retained.

From the results as described above, it is presumed that the metal ions $Ca^{2+}$ in the hard water 21 are adsorbed to the fine bubbles 23 and move upward together with the fine bubbles 23 going up.

Based on the presumption, the effect of "adsorption of metal ions by fine bubbles" described above was demonstrated.

Second Embodiment

An ion removing system according to a second embodiment of the present disclosure will be described. In the second embodiment, differences from the first embodiment will mainly be described. In the second embodiment, the same or equivalent constituent elements as the first embodiment are denoted by the same reference numerals. In the second embodiment, the description overlapping with the first embodiment will not be made.

The second embodiment is different from the first embodiment in that nitrogen is used instead of air as the gas of the fine bubbles in the softening treatment.

It is presumed that by generating and supplying the fine bubbles of nitrogen from the primary-side fine bubble generating part 3B and the secondary-side fine bubble generating part 5B into hard water, actions described in the following sections (5), (6) are promoted in addition to the sections (1), (2), (3), and (4) described above. It is noted that the present disclosure is not bound to the specific principles described in the following sections (5), (6).

(5) Promotion of Adsorption of First and Second Metal Ions

As shown in FIG. 11(a), $H^+$ and $OH^-$ are charged around the fine bubbles. As described above, positively charged $Ca^{2+}$ and $Mg^{2+}$ are adsorbed to negatively charged $OH^-$. When nitrogen is used as the fine bubbles under such circumstances, a reaction of Formula 7 is promoted.

$$N_2 + 6H^+ + 6e^- \rightarrow 2NH_3$$

$$NH_3 + H_2O \rightarrow NH_4^+ + OH^-$$ (Formula 7)

As shown in FIG. 11(b), the number of $H^+$ ions is reduced relative to the number of $OH^-$ ions by promoting the reaction of Formula 7. As a result, a negative charge becomes strong in terms of the fine bubbles, so that $Ca^{2+}$ or $Mg^{2+}$ having a positive charge is easily adsorbed.

When nitrogen is used as in the second embodiment, the reaction of Formula 7 can be promoted as compared to when air is used as in the first embodiment, so that the adsorption of the first and second metal ions is further promoted. As a result, the first and second metal ions can be separated and removed in larger amount from hard water.

The principle is presumed to be applicable not only to nitrogen but also to any gas that can react with $H^+$ ions to reduce the number of $H^+$ ions relative to the number of $OH^-$ ions.

(6) Promotion of Crystallization of First and Second Metal Ions

Since nitrogen is an inert gas different from air, when nitrogen is supplied into hard water, balance of partial pressure is lost in the gas contained in the hard water. This promotes a reaction as shown in FIG. 12.

Figure 12:
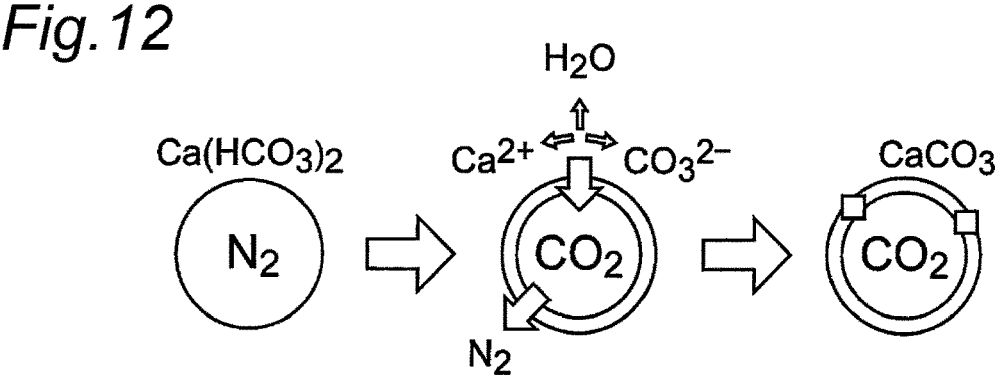
FIG. 12 is a schematic for explaining a hypothetical principle of crystallization of metal ions by the ion removing system according to the second embodiment.

As shown in FIG. 12, another gas component dissolved in hard water acts on the fine bubbles composed of nitrogen to replace nitrogen. In the example shown in FIG. 12, $CO_2$ is contained in $Ca(HCO_3)_2$ present around the fine bubbles, and this $CO_2$ is extracted and acts to replace nitrogen. Additionally, $CO_2$ is contained in $Mg(HCO_3)_2$ present around the fine bubbles, and this $CO_2$ is extracted and acts to replace nitrogen. Specifically, the following reaction is promoted.

$$Ca(HCO_3)_2 \rightarrow CaCO_3 + CO_2 + H_2O$$

$$Mg(HCO_3)_2 \rightarrow MgCO_3 + CO_2 + H_2O$$ (Formula 8)

As described above, a reaction occurs such that insoluble $CaCO_3$ is generated from soluble $Ca(HCO_3)_2$. A reaction also occurs such that insoluble $MgCO_3$ is generated from soluble $Mg(HCO_3)_2$. In this case, $CO_2$ and $H_2O$ are generated. $CaCO_3$ and $MgCO_3$ are insoluble and are thereof deposited as crystals of metal components.

The first metal ions contained as $Ca^{2+}$ of $Ca(HCO_3)_2$ and the second metal ions contained as $Mg^{2+}$ of $Mg(HCO_3)_2$ in the hard water can be crystallized and deposited by the reactions. As a result, the crystals of the metal components can be removed from the hard water.

The principle is presumed to be applicable not only to nitrogen but also to any gas other than air that can break the balance of partial pressure of the gas dissolved in hard water.

Since the fine bubbles are generated by taking in nitrogen and supplied into the hard water in the second embodiment as described above, the reactions described in the sections (5) and (6) can be promoted as compared to when air is used. This can improve the accuracy of removal of the first and second metal ions from the hard water.

In the first embodiment, the secondary-side pH adjustment apparatus 15B is configured to remove carbon dioxide contained in the hard water by spraying the hard water in a mist form in the air; however, the present disclosure is not limited thereto. For example, the secondary-side pH adjustment apparatus 15B may be configured to remove carbon dioxide contained in the hard water by spraying the hard water in a mist form in a nitrogen atmosphere. According to this structure, carbon dioxide in the hard water acts to replace nitrogen, so that carbon dioxide is easily released from the hard water. This can improve the carbon dioxide removal efficiency.

Figure 13:
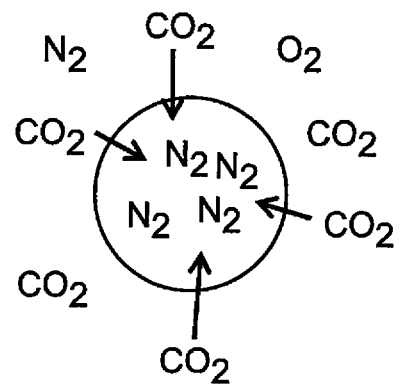
FIG. 13 is a schematic for explaining a hypothetical principle of removal of carbon dioxide by bubbling.

The secondary-side pH adjustment apparatus 15B may be configured to remove carbon dioxide contained in the hard water, for example, by supplying a gas into the hard water for bubbling. In this case, it is preferable to use a gas having a low carbon dioxide concentration, for example, air. It is more preferable to use a gas containing no carbon dioxide, for example, nitrogen, as the gas. According to this configuration, as shown in FIG. 13, nitrogen in bubbles generated by bubbling in the hard water acts to replace nitrogen, so that carbon dioxide is easily released from the hard water. This can improve the carbon dioxide removal efficiency.

The bubbles generated in the hard water by bubbling may have a larger average outer diameter than the fine bubbles generated by the primary-side fine bubble generating part 3B and the secondary-side fine bubble generating part 5B. For example, the bubbles generated in the hard water by bubbling may be milli-bubbles (having a diameter of 1 mm or more and 10 mm or less). The milli-bubbles may be bubbles recognizable as those having a bubble diameter on the order of millimeters by those skilled in the field of water treatment. According to this configuration, a ratio of bubbles in hard water (gas-to-liquid ratio) can be increased (e.g., from several % to 50%) to increase the specific surface area of the bubbles, and the effect of removing carbon dioxide contained in the hard water can be improved.

Examples of a method for removing carbon dioxide contained in hard water include a membrane degassing method, a vacuum degassing method, and a heating degassing method, in addition to the stripping method of spraying a mist and the bubbling method described above. Carbon dioxide contained in hard water may be removed by using an apparatus using these degassing methods. The apparatus using the stripping or bubbling method described above can remove carbon dioxide contained in hard water with a relatively simple structure.

Third Embodiment

A method for removing metal ions by an ion removing system according to a third embodiment of the present disclosure will be described. In the third embodiment, differences from the first and second embodiments will mainly be described, and the description overlapping with the first and second embodiments will not be made.

While the primary-side fine bubble generating part 3B and the secondary-side fine bubble generating part 5B generate fine bubbles containing air in the first and second embodiments, the third embodiment is different from the first and second embodiments in that fine bubbles containing a mixed gas obtained by mixing multiple types of gases are generated.

The mixed gas used for generating the fine bubbles in the third embodiment is a gas obtained by mixing two types of gases, i.e., a first gas that is a basic gas and a second gas that is a gas having a property of slower dissolution rate than the first gas. Therefore, the first metal ion removal gas supply part 9A shown in FIG. 1 supplies the mixed gas obtained by mixing the first gas and the second gas, as the first metal ion removal gas to the primary-side fine bubble generating part 3B. The second metal ion removal gas supply part 9B shown in FIG. 1 supplies the mixed gas obtained by mixing the first gas and the second gas, as the second metal ion removal gas to the secondary-side fine bubble generating part 5B.

It is presumed that by generating the fine bubbles with the mixed gas containing the first gas and the second gas, actions described in the following sections (7), (8) are promoted in addition to the sections (1), (2), (3), and (4) described above. It is noted that the present disclosure is not bound to the specific principles described in the following sections (7), (8).

(7) Potential Change on Surfaces of Fine Bubbles Due to First Gas

The first gas contained in the mixed gas is a basic gas receiving $H^+$ in an acid-base reaction. The first gas dissolves in water to generate $OH^-$. Specifically, the reaction of Formula 9-1 occurs.

$$X + H_2O \rightarrow XH^+ + OH^- \qquad \text{(Formula 9-1)}$$

Figure 14:
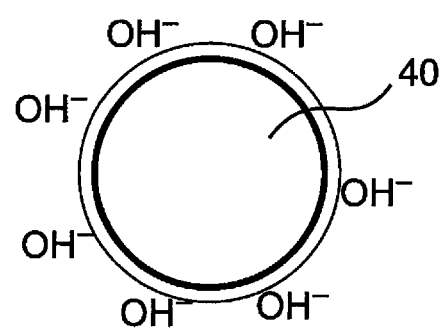
FIG. 14 is a schematic for explaining a hypothetical principle of adsorption of metal ions by an ion removing system according to a third embodiment.

In Formula 9-1, the first gas is represented by Chemical Formula X. When the reaction of Formula 9-1 occurs, as shown in FIG. 14, the proportion of $OH^-$ present around fine bubbles 40 increases as compared to the proportion of $H^+$ ($H^+$ is not shown in FIG. 14). A potential of a solid-liquid interface strongly depends on pH in water quality since $H^+$ and $OH-$ in water are potential-determining ions, and a positive charge becomes stronger as $H^+$ increases while a negative charge becomes stronger as $OH^-$ increases. As a result, a negative charge becomes strong in terms of the fine bubbles 40, so that $Ca^{2+}$ or $Mg^{2+}$ having a positive charge is easily adsorbed. In this way, the first and second metal ion adsorption effect of the fine bubbles 40 can be improved.

Furthermore, in the third embodiment, the basic gas of ammonia is used as the first gas. When ammonia is used, Formula 9-1 is specifically described as in Formula 10.

$$NH_3 + H_2O \rightarrow NH_4^+ + OH^- \qquad \text{(Formula 10)}$$

By generating the fine bubbles 40 using ammonia, which is a versatile gas having high solubility in water, the generation cost of the fine bubbles 40 can be reduced while the first and second metal ion adsorption effect described above is improved.

The principle is presumed to be applicable not only to ammonia but also to any basic gas. Examples of such a basic gas include methylamine, ethylamine, propylamine, isopropylamine, butylamine, hexylamine, cyclohexylamine, dimethylamine, diethylamine, diisopropylamine, dipropylamine, di-n-butylamine, ethanolamine, diethylethanolamine, dimethylethanolamine, ethylenediamine, dimethylaminopropylamine, N,N-dimethylethylamine, trimethylamine, triethylamine, tetramethylenediamine, diethylenetriamine, propyleneimine, pentamethylenediamine, hexamethylenediamine, morpholine, N-methylmorpholine, and N-ethylmorpholine.

As shown in Formula 9-1, X is not limited to a basic gas, and it is probable that the same effect is produced as long as X is a "hydroxyl ion donating gas" reacting with water ($H_2O$) to donate a hydroxyl ion ($OH^-$). Examples of the hydroxyl ion donating gas include a soluble ozone gas ($O_3$). When the ozone gas is supplied to water, the reaction represented by Formula 9-2 similar to Formula 9-1 probably occurs.

$$O_3 + H_2O + 2e^- \rightarrow O_2 + 2OH^- \qquad \text{(Formula 9-2)}$$

According to Formula 9-2, it is probable that the hydroxyl ion donating gas "X" causing the reaction represented by Formula 9-3 produces the same effect.

$$XO + H_2O + 2e^- \rightarrow X + 2OH^- \qquad \text{(Formula 9-3)}$$

Ozone will be described in Experimental Example 7.

(8) Maintenance of Fine Bubbles with Second Gas

As described in the section of "(7) Potential Change on Surfaces of Fine Bubbles Due to First Gas", the first gas is the basic gas contained in the mixed gas and dissolves in water to increase the proportion of OH– on the surfaces of the fine bubbles 40. Such a first gas is mixed with the second gas that is a gas having a property of slower dissolution rate than the first gas. By mixing with such a second gas, the fine bubbles 40 are prevented from being entirely dissolved in water even when the first gas is dissolved in water, so that the state of the fine bubbles 40 can be maintained. By maintaining the state of the fine bubbles 40, the adsorption effect on $Ca^{2+}$ or $Mg^{2+}$ ions attributable to the fine bubbles described in the first and second embodiments can be maintained.

In the third embodiment, nitrogen is used as the second gas. By generating the fine bubbles 40 using nitrogen, which is a versatile gas harmless to the human body, the generation cost of the fine bubbles 40 can be reduced while safety is secured. Moreover, since nitrogen is a non-water-soluble gas (non-soluble gas), the effect of maintaining the state of the fine bubbles 40 can more effectively be exerted.

The principle is presumed to be applicable not only to nitrogen but also to any gas having a property of slower dissolution rate than the first gas, which is a basic gas. When the second gas is selected, a gas to be selected may be a gas having a rate of dissolution (solubility) into water slower (lower) than the first gas under the same conditions including temperature and pressure conditions. Examples of such a second gas include nitrogen, hydrogen, carbon monoxide, butane, oxygen, methane, propane, ethane, nitric oxide, ethylene, propene, acetylene, and carbon dioxide in ascending order of solubility. Among them, when a non-water-soluble gas such as nitric oxide, oxygen, or hydrogen is used, the effect of maintaining the state of the fine bubbles 40 can more effectively be exerted.

Figure 11:
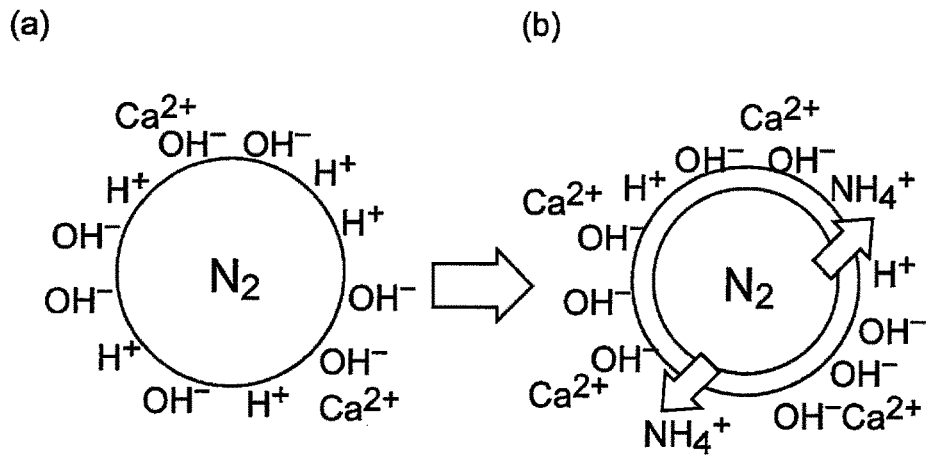
FIG. 11 is a schematic for explaining a hypothetical principle of adsorption of metal ions by an ion removing system according to a second embodiment.

It has been described in the sections of "(5) Promotion of Adsorption of First and Second Metal Ions" and "(6) Promotion of Crystallization of First and Second Metal Ions" that nitrogen dissolves into hard water with reference to FIGS. 11 and 12, and this reaction probably occurs at the same time. Nitrogen is insoluble in water and therefore difficult to dissolve in water so that a strong effect of maintaining the state of the fine bubbles 40 is exerted; however, no small amount of nitrogen dissolves in water. Therefore, the phenomenon of dissolution of nitrogen into water described in the sections (5), (6) occurs to no small extent simultaneously with the phenomenon of maintenance of the fine bubbles with nitrogen described in the section (8).

As described above, the fine bubble generating part of the third embodiment generates the fine bubbles 40 from a mixed gas obtained by mixing the first gas reacting with water to donate hydroxyl ions and the second gas having a property of slower dissolution rate than the first gas. The first gas is a hydroxyl ion donating gas and reacts with water to increase the proportion of OH$^-$ on the surfaces of the fine bubbles 40. This can increase the effect of adsorbing metal ions such as $Ca^{2+}$ to the fine bubbles 40. Furthermore, by mixing the second gas having a property of slower dissolution rate than the first gas, the fine bubbles 40 can be prevented from being completely dissolved in water to maintain the state of the fine bubbles 40.

In the third embodiment, the first gas is a soluble basic gas (ammonia). Since the first gas is a basic gas and is first dissolved in water, and the second gas having a property of slower dissolution rate than the basic gas is negatively charged, the effect can be achieved by utilizing a difference in dissolution rate between the two gases.

Mixing proportions of ammonia and nitrogen in the fine bubbles 40 may be set to any value or may be set, for example, such that the mixing proportion of nitrogen to ammonia becomes larger (e.g., ammonia:nitrogen is 1:99 in an amount of substance (volume ratio)). With such a setting, the increase in OH$^-$ due to the dissolution of ammonia is limited only in a region near the surfaces of the fine bubbles 40, and the proportion of OH$^-$ hardly changes at a position distant from the fine bubbles 40. This can keep the water quality of the entire water unchanged while causing a change only in the vicinity of the surfaces of the fine bubbles 40. On the other hand, by increasing the proportion of nitrogen, the state of the fine bubbles 40 can be maintained longer. In this way, the effect described above can be produced by setting the amount of substance of the second gas, which has a slower dissolution rate than the basic gas, larger than the amount of substance of the first gas, which is the basic gas, in the mixed gas. Since the amount of substance and the volume are proportional to each other under the conditions of the same temperature and the same pressure, the mixing proportions of the first gas and the second gas may be set by using either the amount of substance or the volume.

Alternatively, the mixing proportions may be set such that the mixing proportion of ammonia to nitrogen becomes larger. With such a setting, the first and second metal ions contained in hard water can further be crystallized and removed. The principle of promotion of crystallization as described above will be described in Experimental Examples 3 to 5.

In the third embodiment, unlike a supply form in which ammonia and nitrogen are separately formed into fine bubbles and the fine bubbles are separately supplied to hard water without being mixed, the fine bubbles 40 of the mixed gas obtained by mixing ammonia and nitrogen are supplied to hard water. Such a supply form can prevent ammonia from being dissolved alone at a position distant from the fine bubbles 40, so that the function of increasing OH$^-$ only in the vicinity of the surfaces of the fine bubbles 40 can sufficiently be exerted.

Figure 15:
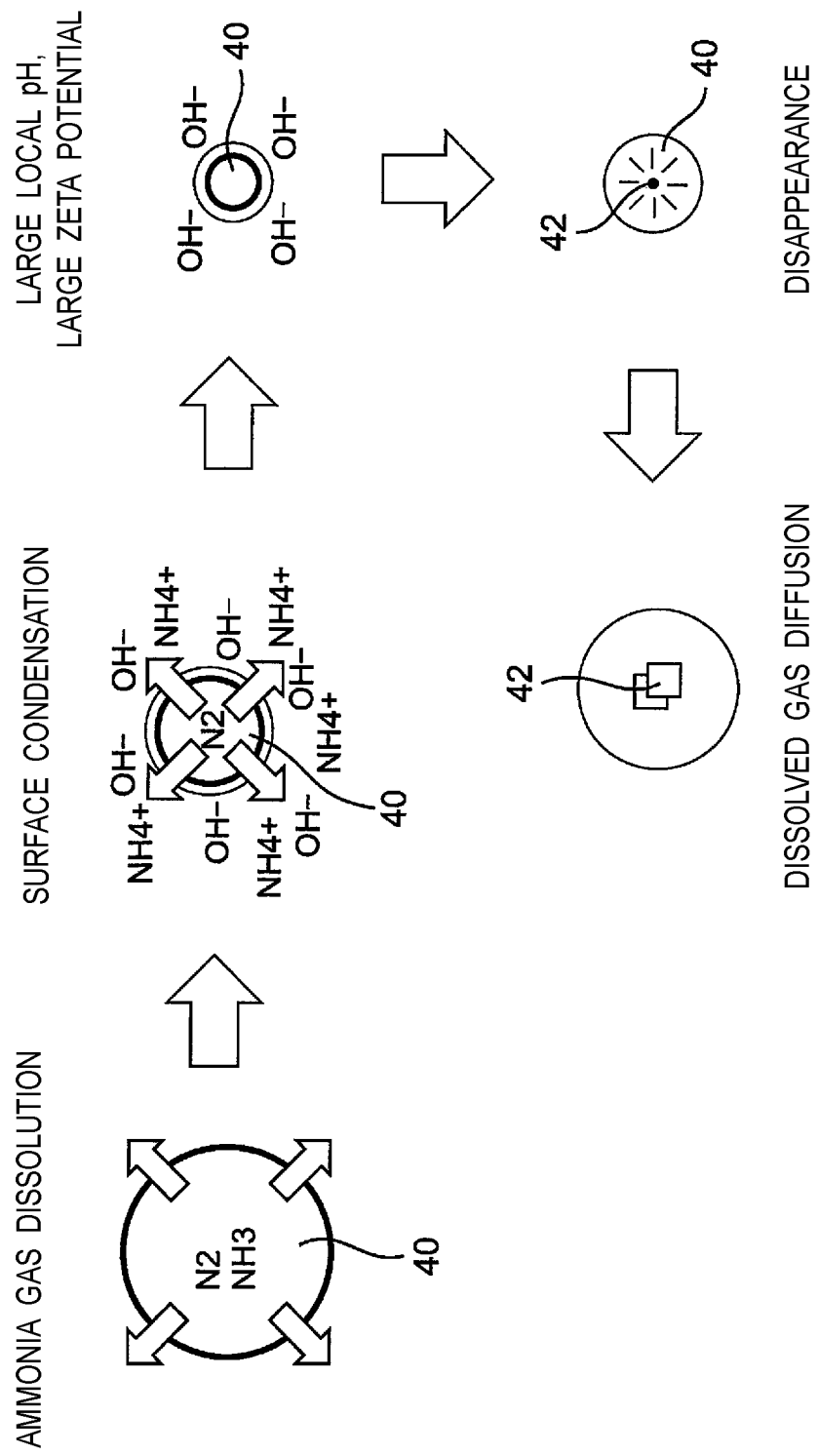
FIG. 15 is a schematic for explaining a hypothetical principle of adsorption and crystallization of metal ions by the ion removing system according to the third embodiment.

A hypothetical principle will be described in terms of the first and second metal ion adsorption effect of the fine bubbles 40 using the mixed gas obtained by mixing the first gas, which is ammonia, and the second gas, which is nitrogen, described above, in particular, until the metal ions are finally crystallized, with reference to a schematic of FIG. 15.

As shown in FIG. 14, when the fine bubbles 40 are supplied into hard water, ammonia is water-soluble and dissolves in surrounding water between ammonia and nitrogen constituting the fine bubbles 40 (ammonia gas dissolution). Therefore, as described in the section of "(7) Potential Change on Surfaces of Fine Bubbles Due to First Gas", $NH_4^+$ is generated on the surfaces of the fine bubbles 40 and the proportion of OH$^-$ increases (surface condensation). In this case, the effect of adsorbing $Ca^{2+}$ or $Mg^{2+}$ ions is increased.

When the surface concentration further proceeds, the concentration of OH$^-$ on the surfaces of the fine bubbles 40 is maximized. Specifically, the pH on the surfaces of the fine bubbles 40 is maximized, and the zeta potential of the fine bubbles 40 is maximized (large local pH, large zeta potential).

In the states of "ammonia gas dissolution", "surface condensation", and "large local pH, large zeta potential", $Ca^{2+}$ or $Mg^{2+}$ is adsorbed to the fine bubbles 40. In this case, if the fine bubbles 40 with $Ca^{2+}$ or $Mg^{2+}$ adsorbed thereto are separated from the hard water, the first and second metal ions can be removed from the hard water.

If the separation is not performed or if the metal ions remain as the fine bubbles 40 even though the separation is performed, crystallization of $Ca^{2+}$ or $Mg^{2+}$ adsorbed to the surfaces of the fine bubbles 40 starts. Specifically, $Ca^{2+}$ or $Mg^{2+}$ is crystallized and deposited as crystals 42. Additionally, as the crystals 42 are deposited, the fine bubbles 40 starts disappearing (disappearance).

As the crystallization of $Ca^{2+}$ or $Mg^{2+}$ and the disappearance of the fine bubbles 40 proceed, water-insoluble nitrogen maintaining the state of the fine bubbles 40 diffuses into water as a dissolved gas (dissolved gas diffusion).

In the states of "disappearance" and "dissolved gas diffusion" described above, those contained as the first and second metal ions in the hard water are deposited as the crystals 42. By separating the crystals 42 deposited in this way from the hard water, the first and second metal ions in the hard water can be crystallized and removed.

Experimental Examples 3 to 5

Experimental Examples 3 to 5 performed to confirm the influence of the mixing proportions of ammonia and nitrogen in the fine bubbles 40 on the crystallization of the metal component will be described. Experiments were conducted by using an apparatus 50 shown in FIG. 16.

Figure 16:
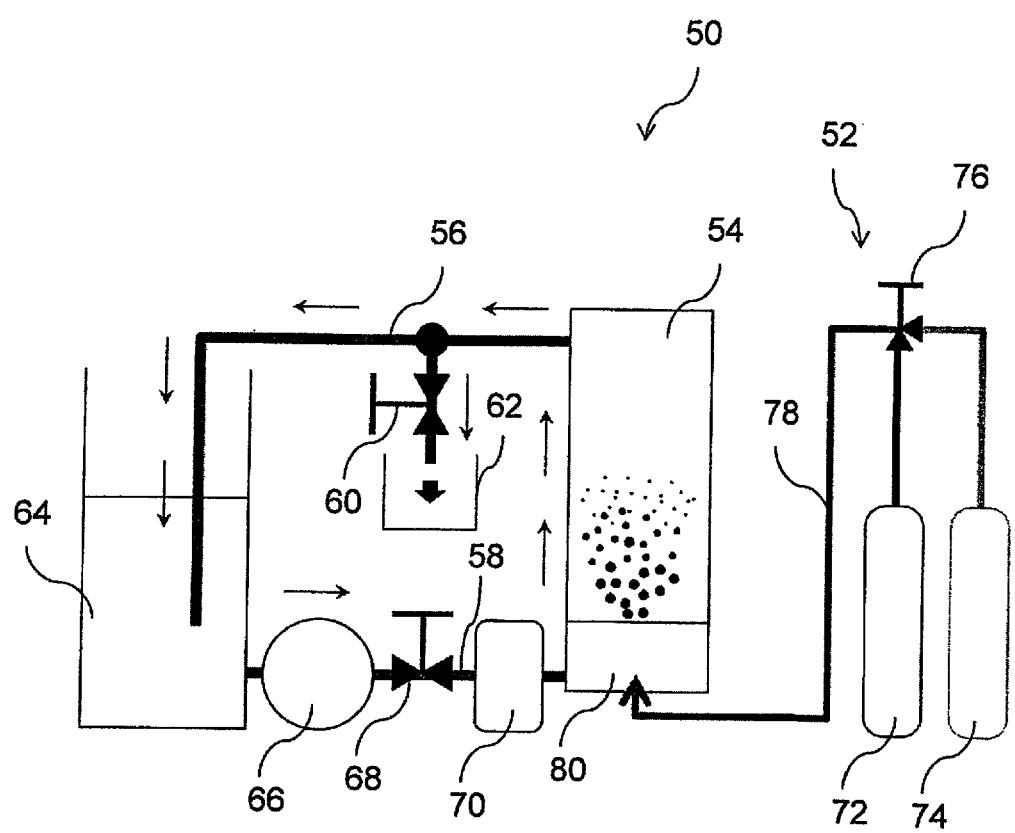
FIG. 16 is a diagram showing a schematic configuration of an apparatus used in Experimental Examples 3 to 5.

FIG. 16 is a diagram showing a schematic configuration of the apparatus 50 used in Experimental Examples 3 to 5. The apparatus 50 shown in FIG. 16 includes a mixed gas supply part 52, a treatment tank 54, a first piping 56, a second piping 58, a water sampling valve 60, a water sampler 62, a water storage tank 64, a pump 66, a flow rate adjustment valve 68, and a flowmeter 70.

The mixed gas supply part 52 is a member supplying the mixed gas to the treatment tank 54. The mixed gas supply part 52 includes an ammonia supply source 72, a nitrogen supply source 74, a mixing ratio adjustment valve 76, a supply piping 78, and a fine bubble generating part 80.

The mixed gas supply part 52 uses the ammonia supply source 72 and the nitrogen supply source 74 to generate the mixed gas obtained by mixing ammonia (the first gas) and nitrogen (the second gas). The mixing proportions of ammonia and nitrogen can be set to any ratio by the mixing ratio adjustment valve 76. The mixed gas is supplied through the supply piping 78 to the fine bubble generating part 80 disposed in a bottom portion of the treatment tank 54. The fine bubble generating part 80 is a member forming fine bubbles of the mixed gas.

The treatment tank 54 is a tank (hard water storage part) storing hard water as treated water to be treated. By supplying the fine bubbles of the mixed gas into the hard water in the treatment tank 54, the metal component is removed, or particularly, crystallized, from the hard water, in accordance with the principle described in the third embodiment. The treated water after treatment is sent to the first piping 56. The water sampling valve 60 is disposed in the middle of the first piping 56. By opening and closing the water sampling valve 60, the treated water passing through the first piping 56 is sampled. The sampled treated water is put into the water sampler 62.

The first piping 56 is connected to the water storage tank 64. The water storage tank 64 is a tank storing the treated water. The treated water stored in the water storage tank 64 is returned through the second piping 58 to the treatment tank 54. As a result, the treated water is circulated.

The pump 66, the flow rate adjustment valve 68, and the flowmeter 70 are attached to the second piping 58. The pump 66 is a member generating a propulsive force causing the treated water in the water storage tank 64 to flow through the second piping 58. The flow rate adjustment valve 68 is a valve adjusting the flow rate of the treated water passing through the second piping 58. The flowmeter 70 is a device measuring the flow rate of the treated water flowing through the second piping 58.

The apparatus 50 as described above was used for performing a treatment of removing the metal component in the hard water in the treatment tank 54 while continuously operating the pump 66 and for collecting the treated water after the treatment from the water sampler 62 to measure various parameters. In Experimental Examples 3 to 5, a rate of crystallization of the metal component contained in the treated water (crystallization rate) was examined. The crystallization rate in this specification is not limited to a substance composed of atoms and molecules periodically arranged with regularity and means a rate of a substance simply deposited as a solid. The crystallization rate may be referred to as "deposition rate".

Figure 17:
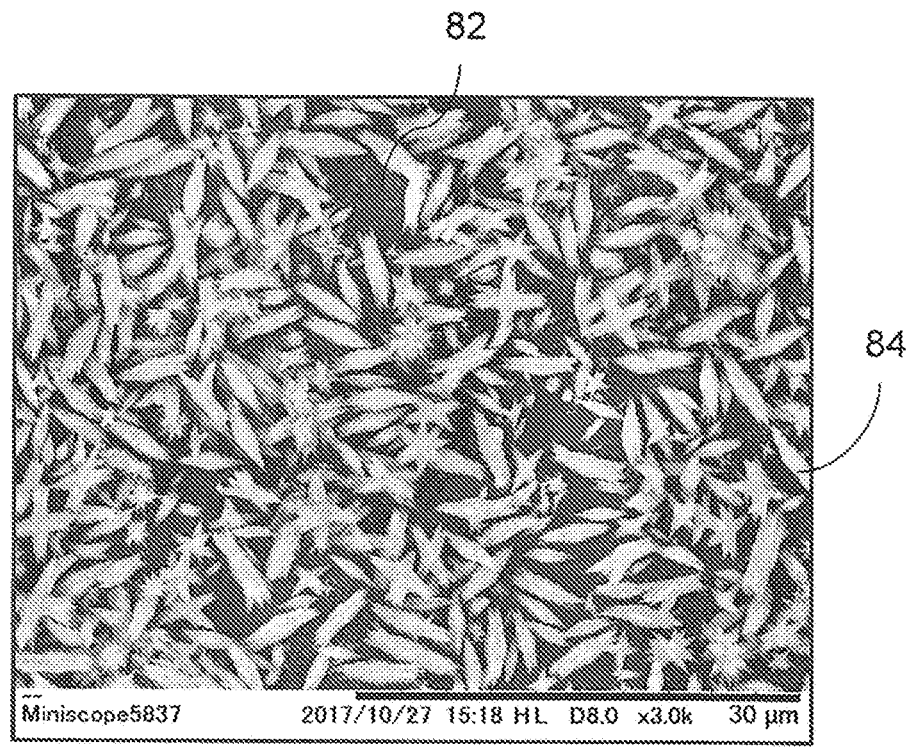
FIG. 17 is a diagram showing a state of a metal component crystallized in hard water.

FIG. 17 shows an example of a result when the treated water actually treated in Experimental Examples 3 to 5 is observed with a scanning electron microscope (SEM). As shown in FIG. 17, a multiplicity of crystals 84 is deposited in treated water 82.

In Experimental Examples 3 and 4, hard water 1 was used as the treated water to be treated. The hard water 1 is Evian (registered trademark) having the hardness of about 300 mg/L. In Experimental Example 5, two types of hard waters 1 and 2 were used. The hard water 2 is Contrex (registered trademark) having the hardness of about 1400 mg/L.

Experimental Example 3

In Experimental Example 3, the apparatus 50 described above was used for collecting the treated water after the elapse of a predetermined time as sample water with the water sampler 62 while operating the pump 66 to cause the hard water to flow into the treatment tank 54. In Experimental Example 3, the mixing proportions of ammonia and nitrogen in the mixed gas were changed to examine differences in the crystallization rate at respective mixing proportions. Specific experimental conditions of Experimental Example 3 are listed below. In Experimental Example 3, the treated water supplied from the treatment tank 54 to the first piping 56 was discarded except the water collected with the water sampler 62 and was not supplied to the water storage tank 64.

Experimental Conditions

Type of treated water: hard water 1
Mixing percentage of ammonia in mixed gas: 0% (nitrogen only), 30%, 40%, 50%, 60%, 70%, 80%, 90%, 100% (ammonia only)
Flow rate of treated water: 2.6 L/min
Flow rate of mixed gas: 0.03 L/min
Time from start of operation of pump to collection: 3 minutes
Measurement items of sample water: pH, Ca hardness (mg/L), total carbonic acid concentration (mg/L)

For the measurement items of the sample water, the collected sample water was filtered to remove crystals of the metal component deposited in the sample water before performing the measurement. The Ca hardness is a value obtained by converting the content of $Ca^{2+}$ contained in the treated water per unit volume into calcium carbonate ($CaCO_3$). Commercially available respective measurement devices were used for measuring the pH, Ca hardness, and total carbonic acid concentration.

Figure 18A:
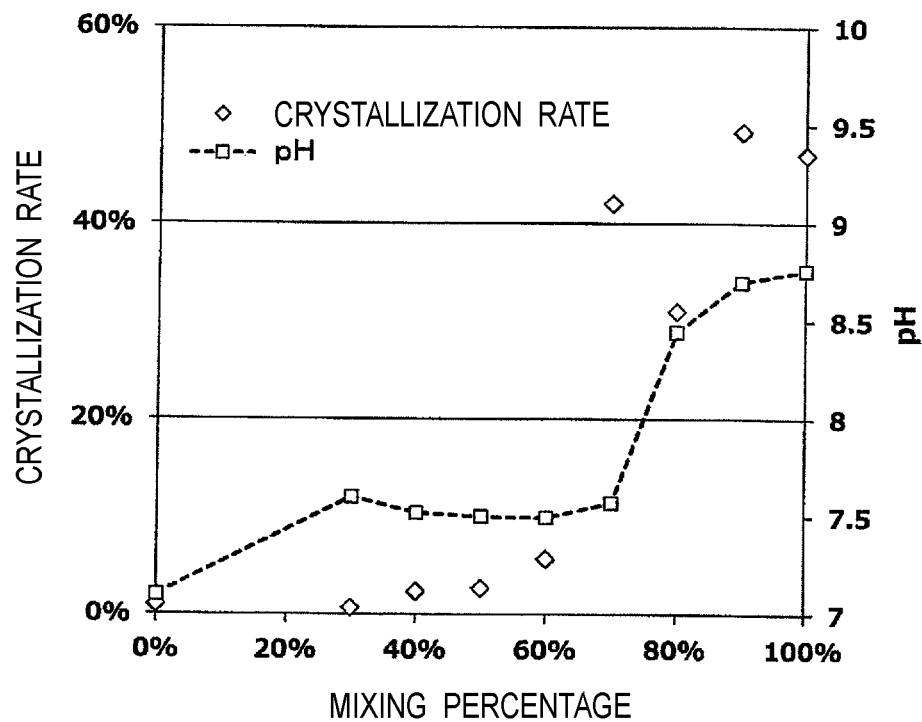
FIG. 18A is a graph showing a result of Experimental Example 3, showing a relationship between a mixing percentage of ammonia and a crystallization rate of sample water.
Figure 18B:
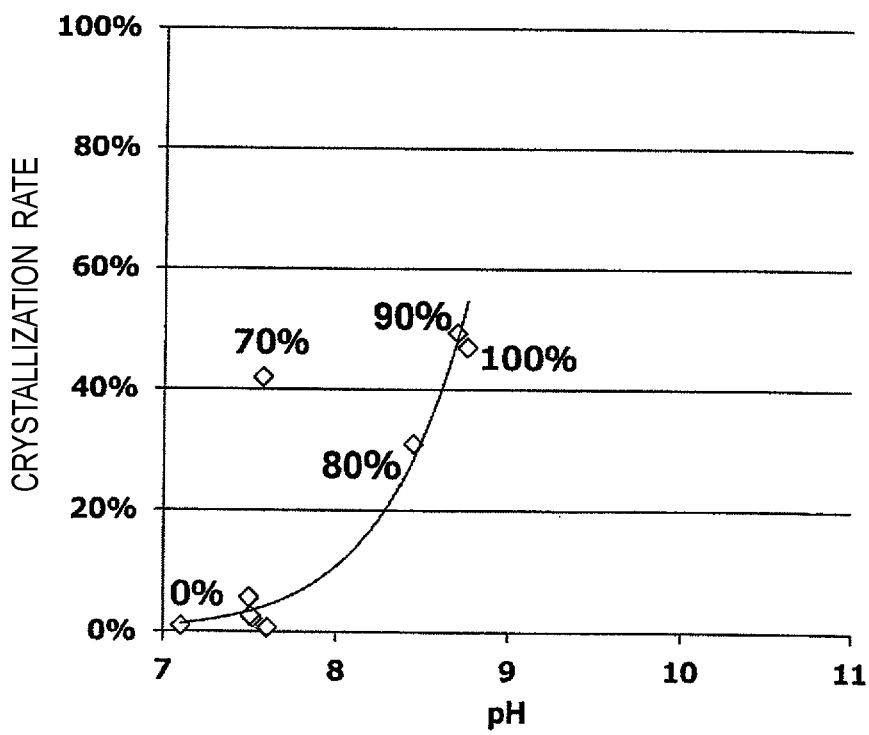
FIG. 18B is a graph showing a result of Experimental Example 3, showing a relationship between pH of the sample water and the crystallization rate of the sample water.

Experimental results of Experimental Example 3 are shown in FIGS. 18A and 18B.

In FIG. 18A, the horizontal axis represents the mixing percentage (%) of ammonia in the mixed gas, and the vertical axis represents the crystallization rate (%) of the sample water. In FIG. 18B, the horizontal axis represents the pH of the sample water, and the vertical axis represents the crystallization rate (%) of the sample water.

The "crystallization rate" was calculated by (the Ca hardness of the sample water before operation—the Ca hardness of the sample water after operation)/the Ca hardness of the sample water before operation. The crystallization rate calculated in this way represents how many metal ions are crystallized in the sample water per unit volume. A higher crystallization rate indicates that more metal ions are crystallized from the sample water.

As shown in FIGS. 18A and 18B, the crystallization rate increases as the mixing percentage of ammonia becomes higher. Particularly, when the mixing percentage of ammonia is 70% or more, the crystallization rate dramatically increases.

As shown in FIGS. 18A and 18B, it can be seen that when the mixing percentage of ammonia is higher, the pH is increased. It is noted that although the pH is increased, the maximum value is between 8.5 and 9. The pH reference value for tap water defined by the Ministry of Health, Labor and Welfare is in the range of 5.8 to 8.6, and it can be seen that even if the mixing percentage of ammonia is high, the pH varies to a value close to the range. Additionally, the desirable drinkable range of alkali ion water prescribed in Pharmaceutical Affairs Law is pH 9 to 10. Since the pH value can be kept lower than this range, it can be seen that the water is suitable as drinking water.

The factor preventing the pH from excessively increasing even at a high mixing percentage of ammonia is probably that the pH is mainly locally increased around the fine bubbles 40 as described above with reference to FIG. 15, rather than increasing the pH of the entire treated water.

Experimental Example 4

In Experimental Example 4, as in Experimental Example 3, the apparatus 50 described above was used for collecting the treated water after the elapse of a predetermined time as sample water with the water sampler 62 while operating the pump 66 to cause the hard water to flow into the treatment tank 54. In Experimental Example 4, only two patterns of 70% and 100% were used for the mixing percentage of ammonia in the mixed gas. Unlike Experimental Example 3, the sample water was collected at predetermined intervals from the start of operation of the pump 66 to measure various parameters. Furthermore, unlike Experimental Example 3, the treated water supplied from the treatment tank 54 to the first piping 56 was all returned to the water storage tank 64 to circulate the treated water except the water collected with the water sampler 62. Specific experimental conditions of Experimental Example 4 are listed below.

Experimental Conditions

Figure 19A:
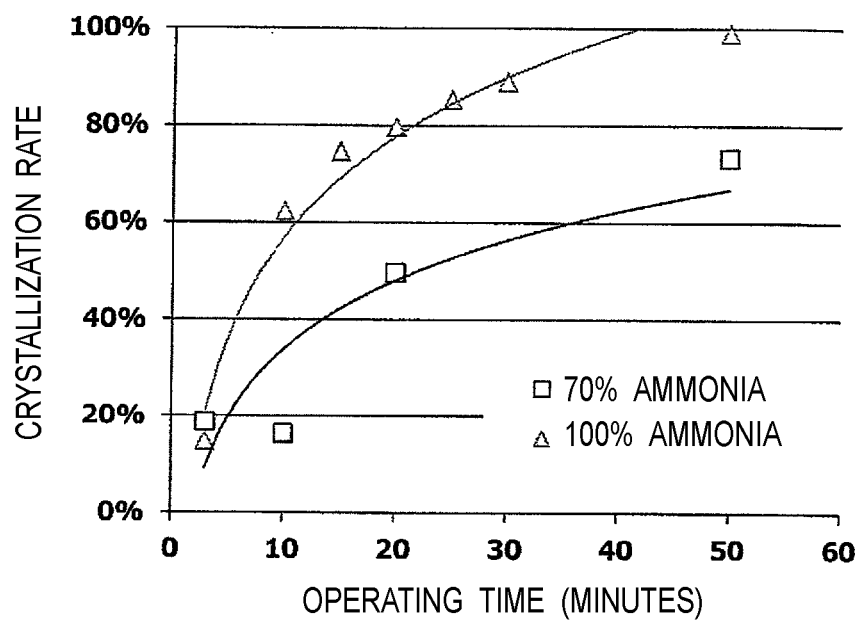
FIG. 19A is a graph showing a result of Experimental Example 4, showing a relationship between an operating time of a pump and the crystallization rate of the sample water.
Figure 19B:
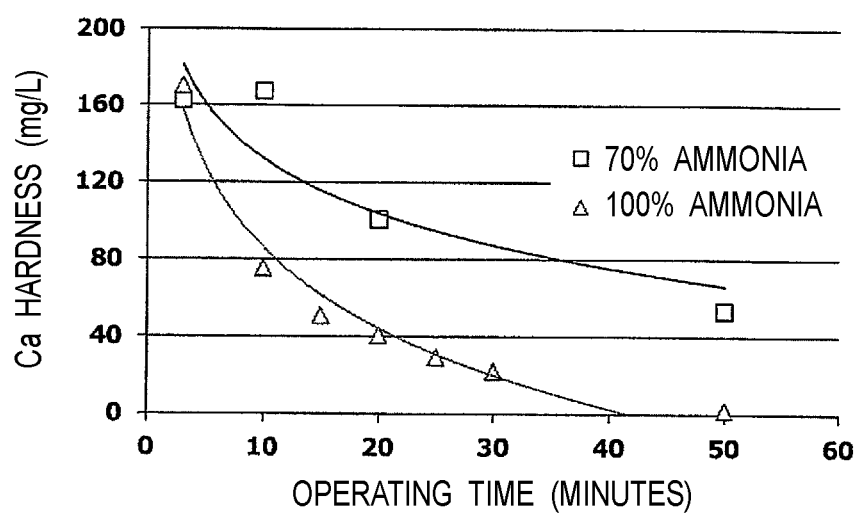
FIG. 19B is a graph showing a result of Experimental Example 4, showing a relationship between the operating time of the pump and the Ca hardness of the sample water.
Figure 19C:
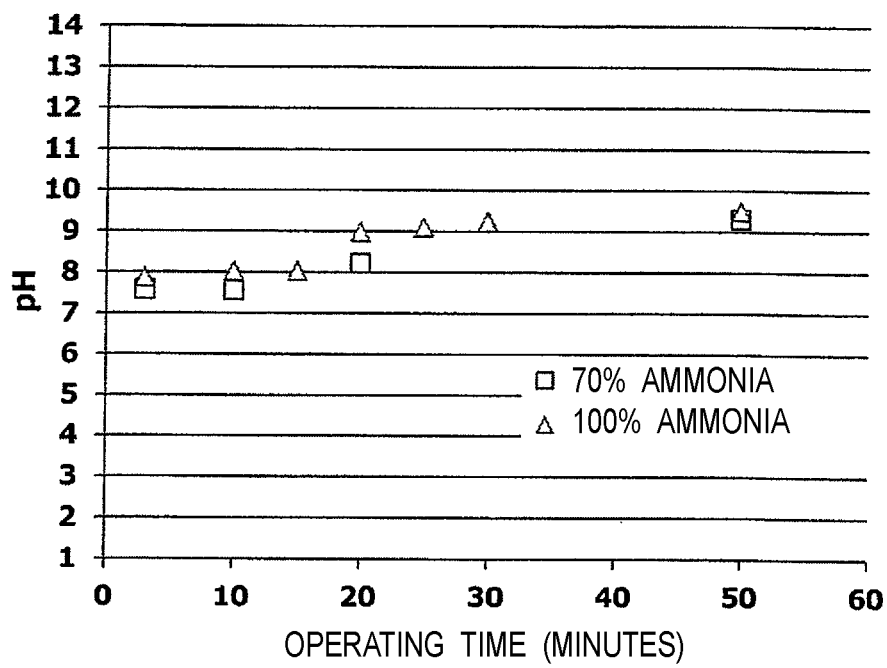
FIG. 19C is a graph showing a result of Experimental Example 4, showing a relationship between the operating time of the pump and the pH of the sample water.

Type of treated water: hard water 1
Mixing percentage of ammonia in mixed gas: 70%, 100% (ammonia only)
Flow rate of treated water: 2.6 L/min
Flow rate of mixed gas: 0.03 L/min
Measurement items of sample water: pH, Ca hardness (mg/L), total carbonic acid concentration (mg/L)
Experimental results of Experimental Example 4 are shown in FIGS. 19A, 19B, and 19C.

In FIG. 19A, the horizontal axis represents the operating time (minutes) of the pump 66, and the vertical axis represents the crystallization rate (%) of the sample water. In FIG. 19B, the horizontal axis represents the operating time (minutes) of the pump 66, and the vertical axis represents the Ca hardness (mg/L) of the sample water. In FIG. 19C, the horizontal axis represents the operating time (minutes) of the pump 66, and the vertical axis represents the pH of the sample water.

As shown in FIG. 19A, the crystallization rate increases as the operating time elapses, regardless of whether the ammonia mixing percentage is 70% or 100%. As shown in FIG. 19B, the Ca hardness decreases as the operating time elapses. This reveals that the metal component $Ca^{2+}$ dissolved in the hard water is crystallized as $CaCO_3$ due to introduction of the fine bubbles using the mixed gas.

On the other hand, the increase speed of the crystallization rate and the decrease speed of the Ca hardness are faster when the mixing percentage of ammonia is 100% than when the mixing percentage is 70%. This reveals that ammonia significantly contributes to the crystallization of $Ca^{2+}$ into $CaCO_3$.

As shown in FIG. 19C, the pH gradually increases as the operating time elapses, regardless of whether the mixing percentage of ammonia is 70% or 100% No significant difference is observed in pH value between when the mixing percentage of ammonia is 70% and when the mixing percentage is 100%. Even when the operating time of 50 minutes has elapsed, the pH is between 9 and 10 and is not excessively increased. The factor moderating the increase speed of the pH in this way is probably that the pH is mainly locally increased around the fine bubbles 40 as described above with reference to FIG. 15, rather than increasing the pH of the entire treated water.

Experimental Example 5

In Experimental Example 5, as in Experimental Examples 3 and 4, the apparatus 50 described above was used for collecting the treated water after the elapse of a predetermined time as sample water with the water sampler 62 while operating the pump 66 to cause the hard water to flow into the treatment tank 54. As in Experimental Example 4, the sample water was collected at predetermined intervals from the start of operation of the pump 66 to measure various parameters. As in Experimental Example 4, the treated water supplied from the treatment tank 54 to the first piping 56 was all returned to the water storage tank 64 to circulate the treated water except the water collected with the water sampler 62. On the other hand, in Experimental Example 5, only one pattern of 70% was used for the mixing percentage of ammonia in the mixed gas. Unlike Experimental Examples 3 and 4, two kinds of hard waters, i.e., the hard water 1 (hardness: about 300 mg/L) and the hard water 2 (hardness: about 1400 mg/L), were used as the treated water. Specific experimental conditions of Experimental Example 5 are listed below.

Experimental Conditions

Types of treated water: hard water 1, hard water 2
Mixing percentage of ammonia in mixed gas: 70%
Flow rate of treated water: 2.6 L/min
Flow rate of mixed gas: 0.03 L/min
Measurement items of sample water: pH, Ca hardness (mg/L), total carbonic acid concentration (mg/L)
Experimental results of Experimental Example 5 are shown in FIGS. 20A, 20B, 20C, and 20D.

Figure 20A:
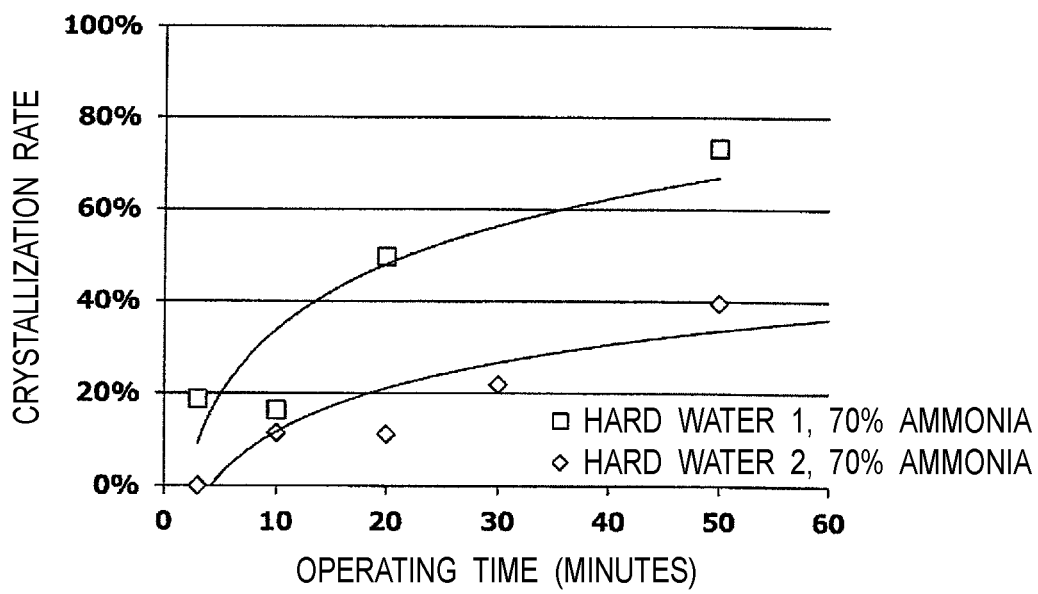
FIG. 20A is a graph showing a result of Experimental Example 5, showing a relationship between the operating time of the pump and the crystallization rate of the sample water.
Figure 20B:
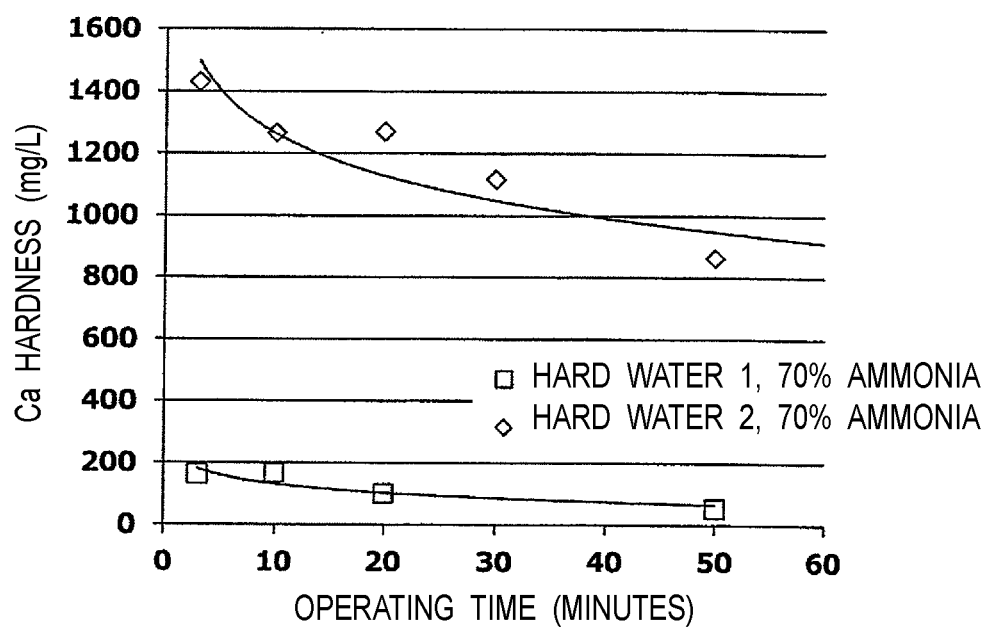
FIG. 20B is a graph showing a result of Experimental Example 5, showing a relationship between the operating time of the pump and the Ca hardness of the sample water.
Figure 20C:
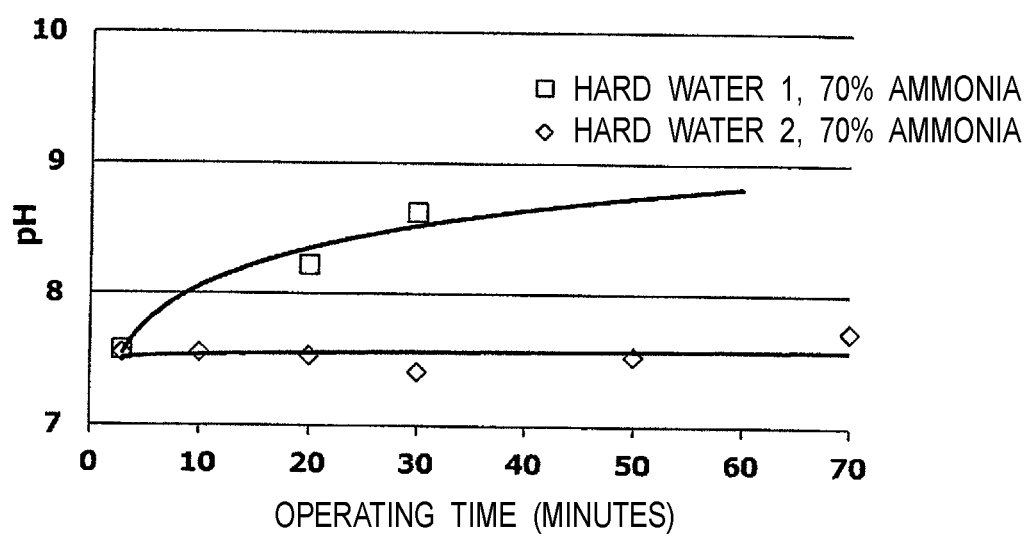
FIG. 20C is a graph showing a result of Experimental Example 5, showing a relationship between the operating time of the pump and the pH of the sample water.
Figure 20D:
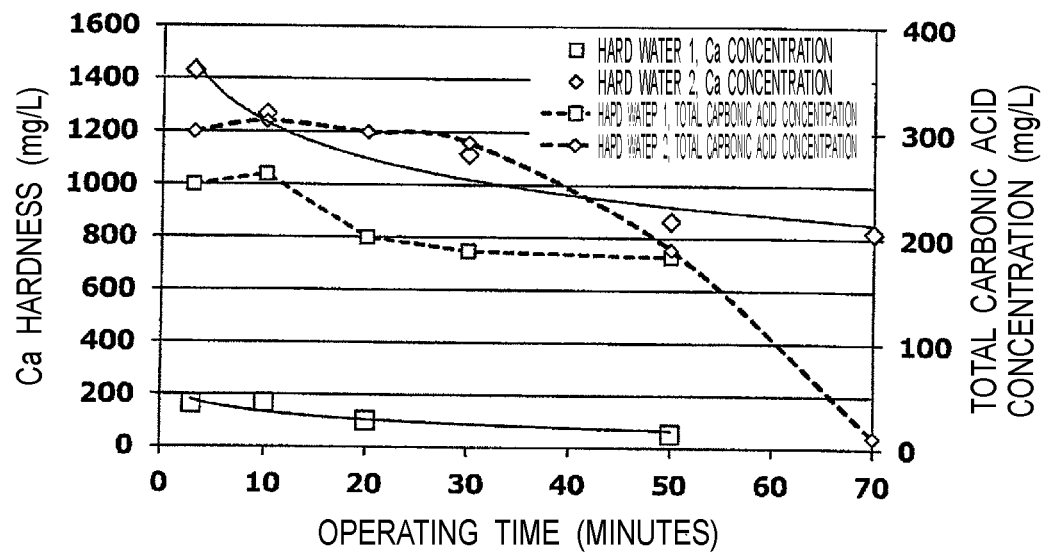
FIG. 20D is a graph showing a result of Experimental Example 5, showing a relationship between the operating time of the pump and each of the Ca hardness and the total carbonic acid concentration of the sample water.

In FIG. 20A, the horizontal axis represents the operating time (minutes) of the pump 66, and the vertical axis represents the crystallization rate (%) of the sample water. In FIG. 20B, the horizontal axis represents the operating time (minutes) of the pump 66, and the vertical axis represents the Ca hardness (mg/L) of the sample water. In FIG. 20C, the horizontal axis represents the operating time (minutes) of the pump 66, and the vertical axis represents the pH of the sample water. FIG. 20D is a graph of FIG. 20B in which the total carbonic acid concentration (mg/L) is added to the vertical axis.

As shown in FIGS. 20A and 20B, in both the hard water 1 and the hard water 2, the crystallization rate increases and the Ca hardness decreases as the operating time elapses. This reveals that the metal component $Ca^{2+}$ dissolved in the hard water is crystallized as $CaCO_3$ due to introduction of the fine bubbles using the mixed gas.

As shown in FIGS. 20A and 20C, it can be seen that the increase speed of the crystallization rate and the increase speed of the pH are significantly different between the hard water 1 and the hard water 2. Specifically, it can be seen that the increase speed of the crystallization rate and the increase speed of the pH are higher in the hard water 1 than the hard water 2. In this regard, the present inventors focused attention on "total carbonic acid concentration" and conducted a study based on data shown in FIG. 20D.

As shown in FIG. 20O, the total carbonic acid concentration of the hard water 1 has a value of 150 to 200 mg/L when the operating time is 50 minutes. Therefore, the hard water 1 contains large amounts of $HCO_3^-$ and $CO_3^{2-}$. When the operating time is 50 minutes, the crystallization rate of the hard water 1 has reached 70 to 80% as shown in FIG. 20A. On the other hand, the total carbonic acid concentration of the hard water 2 has value of about 20 mg/L when the operating time is 70 minutes. As compared to the hard water 1, it can be seen that the contents of $HCO_3^-$ and $CO_3^{2-}$ are significantly smaller in the hard water 2. According to the data shown in FIG. 20A, the crystallization rate of the hard water 2 is expected to be about 40% when the operating time is 70 minutes.

As described in the principles of the first to third embodiments, $HCO_3^-$ and $CO_3^{2-}$ function as components for crystallizing $Ca^{2+}$ as $CaCO_3$. It is probable that the increase speed of the crystallization rate is higher in the hard water 1 than the hard water 2 since $HCO_3^-$ and $CO_3^{2-}$ are contained in larger amounts.

Table 1 shows contents of metal components contained in the hard waters 1, 2 and the total carbonic acid concentration.

TABLE 1

|  | content (mg/L) | | | amount of $CO_3^{2-}$ required for dissolution (mg/L) | | | |
| --- | --- | --- | --- | --- | --- | --- | --- |
|  | Ca | Mg | $CO_3^{2-}$ | Ca | Mg | total | surplus amount |
|  |  |  |  | molecular weight | | | |
|  | 40 | 24.3 | 60 |  | 60 |  | (mg/L) |
| Contrex | 468 | 74.8 | 372 | 702 | 184.691358 | 886.691358 | −514.691 |
| Evian | 80 | 26 | 357 | 120 | 64.19753086 | 184.1975309 | 172.8025 |

As shown in Table 1, the contents of Ca, Mg, and $CO_3^{2-}$ per unit volume contained in the hard water 1, i.e., Evian (registered trademark), are 80, 26, and 357 mg/L, respectively. The contents of Ca, Mg, and $CO_3^{2-}$ per unit volume contained in the hard water 2, i.e., Contrex (registered trademark), are 468, 74.8, and 372 mg/L. Therefore, the contents of $CO_3^{2-}$ per unit volume contained in the hard water 1 and the hard water 2 are 357 mg/L and 372 mg/L, which are substantially the same. On the other hand, the amount of $CO_3^{2-}$ required for dissolution of Ca and Mg relative to the contents of Ca and Mg contained in hard water is about 184 mg/L for the hard water 1 and about 887 mg/L for the hard water 2. Therefore, the hard water 1 has surplus of about 173 mg/L of the actually contained amount of $CO_3^{2-}$ relative to the amount of $CO_3^{2-}$ required for dissolution of Ca and Mg. This means that $CO_3^{2-}$ for crystallizing $Ca^{2+}$ is abundantly present when the fine bubbles of the mixed gas are introduced. On the other hand, the hard water 2 is about 515 mg/L short of the actually contained amount of $CO_3^{2-}$ relative to the amount of $CO_3^{2-}$ required for dissolution of Ca and Mg. As a result, when the fine bubbles of the mixed gas are introduced, crystallization is probably not promoted due to short of $CO_3^{2-}$ for crystallizing $Ca^{2+}$.

From the results described above, it is probable that if the hard water to be treated abundantly contains carbonic acid such as $HCO_3^-$ and $CO_3^{2-}$, the increase speed of crystallization can be improved. Based on this fact, to increase the total carbon dioxide content of the hard water, a carbonic acid gas may be introduced into the hard water before introducing the fine bubbles. Specifically, a carbonic acid gas generating part generating a carbonic acid gas may further be included. Before supplying the fine bubbles generated by the fine bubble generating part to the hard water, a carbonic acid gas may be generated by the carbonic acid gas generating part and supplied into the hard water. This can probably promote the crystallization of the metal component in the hard water.

As described above, according to Experimental Examples 3 to 5, the crystallization of the metal component can be promoted by setting the amount of substance of ammonia larger than the amount of substance of nitrogen in the mixed gas. Furthermore, by setting the mixing percentage of ammonia in the mixed gas to 70% or more, the crystallization of the metal component can significantly be promoted.

Experimental Example 6

Experimental example 6 is a sensory evaluation experiment for evaluating "foaming" for the sample water (soft water) treated by using the apparatus 50 described above. The foaming is related to a foaming power according to height and size of foam generated from a water surface. It is generally considered that when an amount of hardness components is smaller, the foaming is larger, which is advantageous in that a washing effect is increased when the water is used for the purpose of washing, for example.

In Experimental Example 6, unlike Experimental Examples 3 to 5, fine bubbles were generated from a single gas of ammonia instead of the mixed gas. Specifically, in the apparatus 50 shown in FIG. 16, fine bubbles were generated by using only the ammonia supply source 72 without using the nitrogen supply source 74. The method of using the apparatus 50 is the same as in Experimental Examples 3 to 5 and therefore will not be described.

The experimental method of Experimental Example 6 is based on the standard of "foaming": SHASE-S 218 of the Society of Heating, Air-Conditioning and Sanitary Engineers of Japan. Specifically, diluted water was prepared by diluting 1.5 g of pure soap with 200 ml of water, and 1 mL of the diluted water and 9 mL of treated water of interest were mixed and put into a measuring cylinder as 10 mL of evaluation water. COW BRAND Soap Red Box al (Cow Brand Soap Kyoshinsha Co., Ltd.) was used for the pure soap, and distilled water of Autostill WG221 (Yamato Scientific Co., Ltd.) was used for 200 ml of water. The measuring cylinder was shaken 50 times, and a height of the foam from the water surface was measured after 1 minute.

In Experimental Example 6, the same experiment was performed with three types of water, i.e., hard water, tap water, and pure water, in addition to the sample water treated by the apparatus 50. Hardnesses of these waters and the sample water are as follows.

Figure 21:
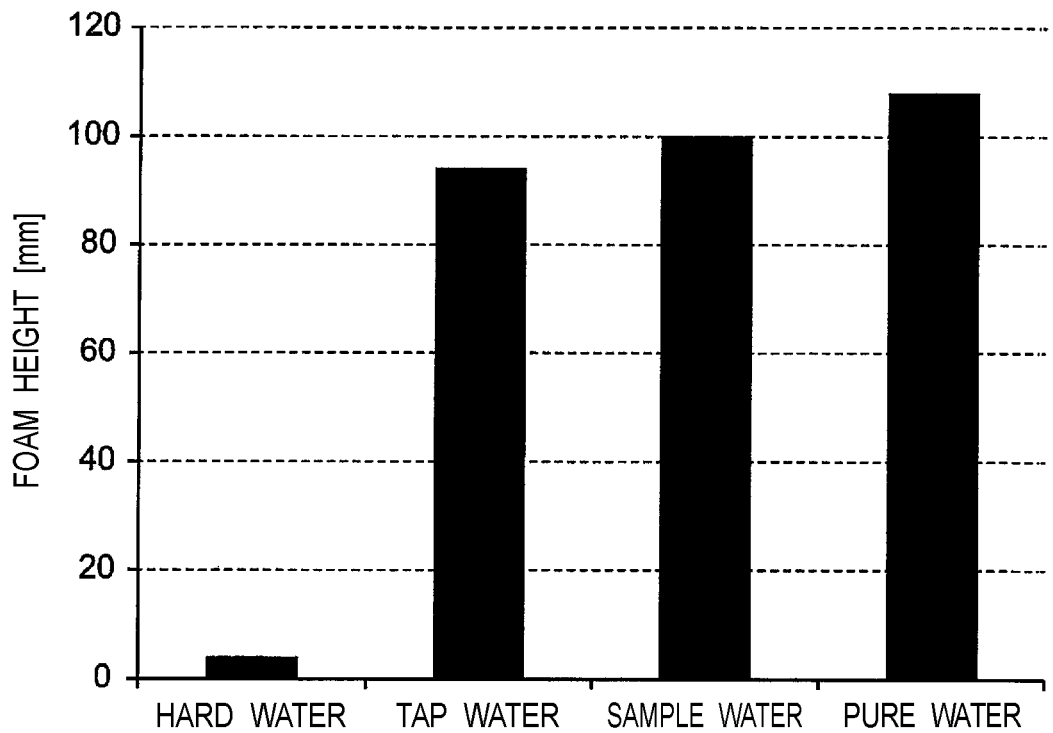
FIG. 21 is a graph showing a result of Experimental Example 6, showing a relationship between a type of water and a height of bubbles extending from a water surface of evaluation water.

Hardness of hard water: total hardness 300 mg/L, Ca hardness 200 mg/L, Mg hardness 100 mg/L Hardness of tap water: total hardness 72 mg/L, Ca hardness 49 mg/L, Mg hardness 23 mg/L Hardness of pure water: total hardness 0 mg/L, Ca hardness 0 mg/L, Mg hardness 0 mg/L Hardness of sample water: total hardness 118 mg/L, Ca hardness 21 mg/L, Mg hardness 97 mg/L Experimental results of Experimental Example 6 are shown in FIG. 21. In FIG. 21, the horizontal axis represents the type of water, and the vertical axis represents the height (mm) of the foam extending from the surface of the evaluation water. The vertical axis represents the foaming and the foaming power.

As shown in FIG. 21, while the "hard water" was highest in both the Ca hardnesses and the Mg hardnesses and showed little foaming close to 0, the "tap water", the "sample water", and the "pure water" showed approximately the same high levels of foaming. Therefore, the "sample water" treated by using the apparatus 50 is improved in terms of foaming as compared to the hard water before treatment and achieves the foaming close to the "tap water"

and the "pure water". This demonstrates that the foaming can be improved by removing the metal ions from the hard water with the method of the embodiments and that the foaming can be achieved at the same level as tap water and pure water, which are soft water.

Comparing the results shown in FIG. 21 with the specific values of the hardness, when the Ca hardness is lower, the foaming becomes larger. This reveals that the value of the Ca hardness rather than the Mg hardness is a dominant parameter having a direct influence on the foaming.

Experimental Example 7

In Experimental Example 7, the treated water (hard water) is treated by using the same apparatus 50 (FIG. 16) as in Experimental Examples 3 to 5 to compare the crystallization rate of the treated sample water.

In Experimental Example 7, differences in the crystallization rate were compared between the case of using microbubbles, which are fine bubbles, and the case of using milli-bubbles, which are not fine bubbles. Specifically, in the apparatus 50 shown in FIG. 16, an experiment was performed in two patterns by using the fine bubble generating part 80 as it is to generate microbubbles, and by using another bubble generating part (not shown) instead of the fine bubble generating part 80 to generate milli-bubbles.

In Experimental Example 7, unlike Experimental Examples 3 to 5, the bubbles were generated from a single gas of ozone instead of the mixed gas. Specifically, in the apparatus 50 shown in FIG. 16, an ozone supply source (not shown) was used instead of the ammonia supply source 72 and the nitrogen supply source 74. As described in Experimental Example 3, the ozone gas is a hydroxyl ion donating gas.

Experimental conditions of Experimental Example 7 are as follows.

Type of treated water (common): hard water 1
Flow rate of treated water (common): 12 L/min
Volume of water stored in the treatment tank 54 (common): 9 L
Flow rate of ozone gas (common): 0.12 L/min
Average bubble diameter of microbubbles: 56 μm
Average bubble diameter of milli-bubbles: 1021 μm
Measurement items of sample water (common): Ca hardness (mg/L), total hardness (mg/L)

Figure 22A:
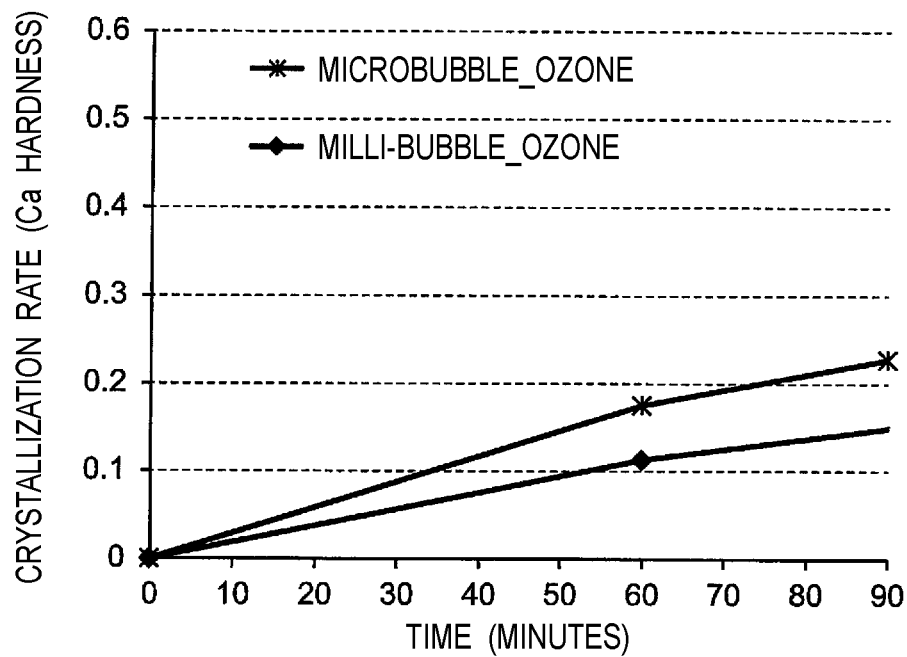
FIG. 22A is a graph showing a result of Experimental Example 7, showing a relationship between time and a crystallization rate of Ca hardness.
Figure 22B:
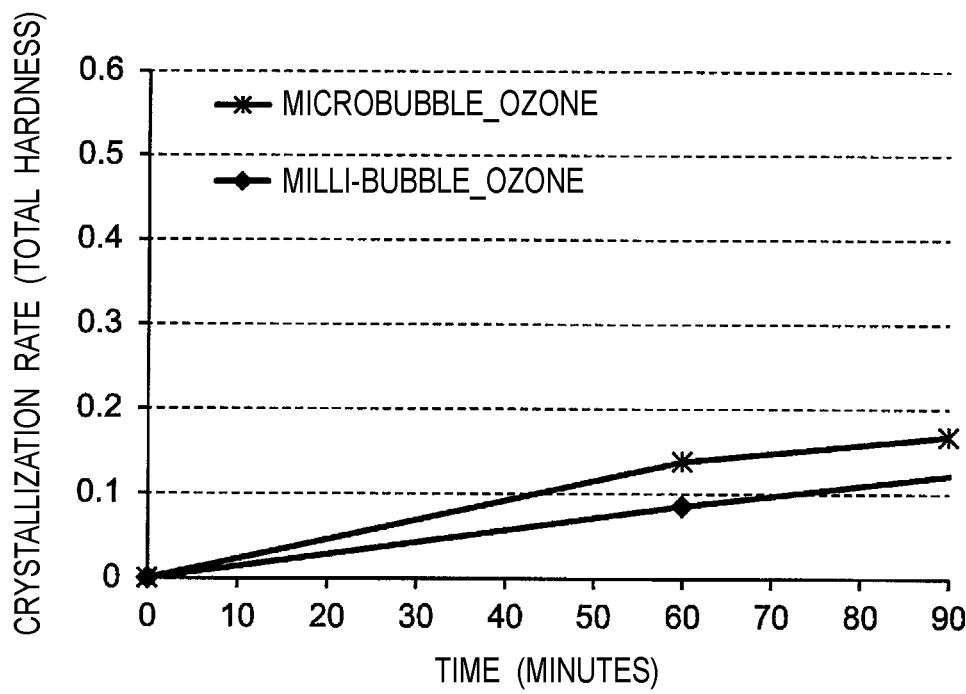
FIG. 22B is a diagram showing a result of Experimental Example 7, which is a graph showing a relationship between time and a crystallization rate of total hardness.

Experimental results of Experimental Example 7 are shown in FIGS. 22A and 22B.

In FIG. 22A, the horizontal axis represents the time (minutes), and the vertical axis represents the crystallization rate (%) of the Ca hardness. In FIG. 22B, the horizontal axis represents the time (minutes), and the vertical axis represents the crystallization rate (%) of the total hardness.

As shown in FIGS. 22A and 22B, it can be seen that the micro-bubbles achieve higher crystallization rates than the milli-bubbles for both the Ca hardness and the total hardness. Therefore, the crystallization rate is higher in the case of using the micro-bubbles, which are the fine bubbles, as compared to the case of using the milli-bubbles, which are not the fine bubbles, and this demonstrates the metal ion crystallization effect of the fine bubbles.

Fourth Embodiment

An ion removing system according to a fourth embodiment of the present disclosure will be described. In the fourth embodiment, differences from the first embodiment will mainly be described. In the fourth embodiment, the same or equivalent constituent elements as the first embodiment are denoted by the same reference numerals. In the fourth embodiment, the description overlapping with the first embodiment will not be made.

Figure 23:
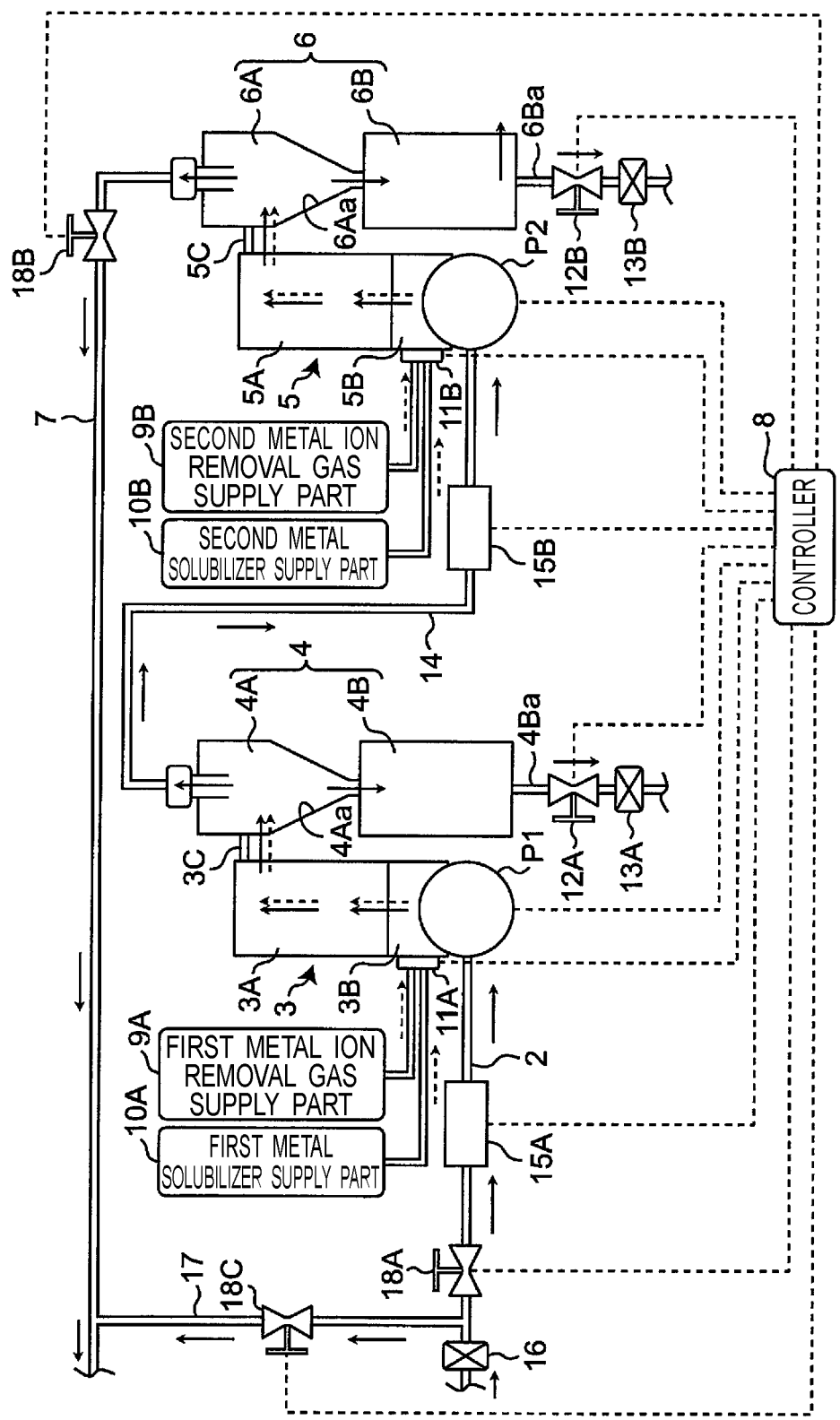
FIG. 23 is a schematic diagram of an ion removing apparatus according to a fourth embodiment.

FIG. 23 is a schematic of the ion removing system according to the fourth embodiment. The fourth embodiment is different from the first embodiment in that the primary-side flow path 2 is provided with a primary-side pH adjustment apparatus 15A.

The primary-side pH adjustment apparatus 15A is an apparatus increasing the pH of the hard water contained in the primary-side hard water storage part 3A. In the fourth embodiment, the primary-side pH adjustment apparatus 15A includes a secondary-side degassing apparatus removing carbon dioxide contained in the hard water. The drive of the primary-side pH adjustment apparatus 15A is controlled by the controller 8.

Figure 24:
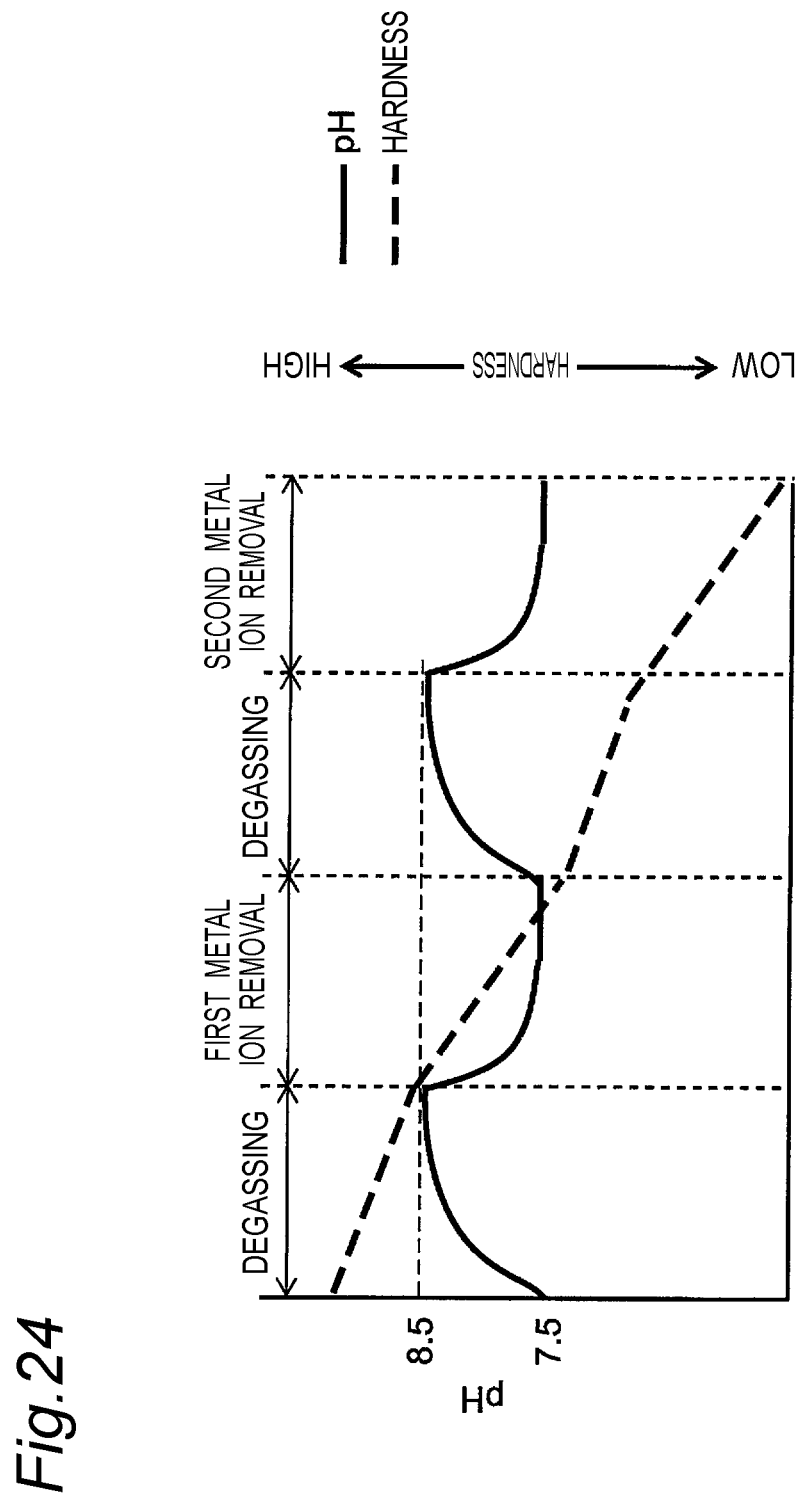
FIG. 24 is a graph schematically showing changes in pH and hardness of hard water flowing through the ion removing system according to the fourth embodiment.

FIG. 24 is a graph schematically showing changes in pH and hardness of hard water flowing through the ion removing system according to the fourth embodiment.

As shown in FIG. 24, since the primary-side pH adjustment apparatus 15A removes carbon dioxide from the hard water, the pH of the hard water increases. Since the pH of the hard water increases, the hardness of the hard water slightly decreases. Subsequently, as the primary-side ion removing apparatus 3 removes the first metal ions from the hard water, the hardness of the hard water decreases, and the pH also decreases. Subsequently, the pH of the hard water is increased by the secondary-side pH adjustment apparatus 15B removing carbon dioxide from the hard water. In this case, since the pH of the hard water increases, the hardness of the hard water slightly decreases. Subsequently, as the secondary-side ion removing apparatus 5 removes the second metal ions from the hard water having the increased pH, the hardness of the hard water further decreases, and the pH of the hard water decreases again.

According to the ion removing system of the fourth embodiment, the pH of the hard water is increased by the primary-side pH adjustment apparatus 15A to increase a power of adsorption of the first metal ions by the fine bubbles, so that the removal efficiency of the first metal ions can be improved. Additionally, the pH of the hard water with the first metal ions removed is increased by the secondary-side pH adjustment apparatus 15B to increase a power of adsorption of the second metal ions by the fine bubbles, so that the removal efficiency of the second metal ions can be improved.

Fifth Embodiment

An ion removing system according to a fifth embodiment of the present disclosure will be described. In the fifth embodiment, differences from the fourth embodiment will mainly be described. In the fifth embodiment, the same or equivalent constituent elements as the fourth embodiment are denoted by the same reference numerals. In the fifth embodiment, the description overlapping with the fourth embodiment will not be made.

Figure 25:
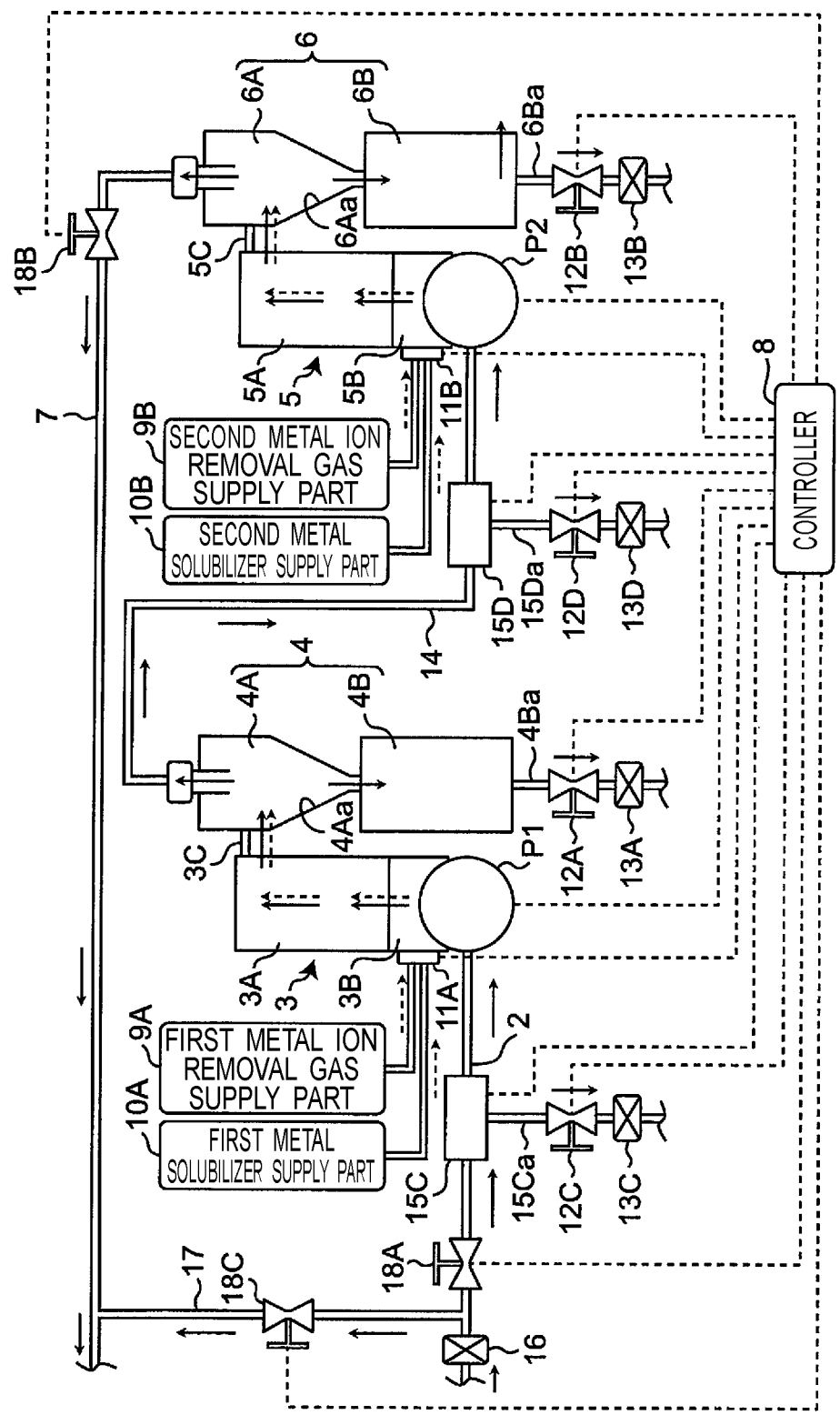
FIG. 25 is a schematic diagram of an ion removing apparatus according to a fifth embodiment.

FIG. 25 is a schematic of the ion removing system according to the fifth embodiment. The fifth embodiment is different from the fourth embodiment in that a primary-side pH adjustment apparatus 15C is disposed instead of the primary-side pH adjustment apparatus 15A and that a secondary-side pH adjustment apparatus 15D is disposed instead of the secondary-side pH adjustment apparatus 15B.

The primary-side pH adjustment apparatus 15C is an apparatus increasing the pH of the hard water contained in the primary-side hard water storage part 3A. In the fifth embodiment, the primary-side pH adjustment apparatus 15C includes a primary-side electrolysis apparatus electrolyzing hard water to generate acidic water and alkaline water. The primary-side pH adjustment apparatus 15C is configured to supply the alkaline water as hard water to the primary-side hard water storage part 3A. The primary-side pH adjustment apparatus 15C includes a discharge flow path 15Ca for discharging the acidic water electrolyzed from the hard water. The primary-side pH adjustment apparatus 15C can substantially increase the pH of the hard water by separating the acidic water from the hard water while leaving the alkaline water. For example, the pH of the hard water can be increased to 9 or more. The primary-side pH adjustment apparatus 15C may be an alkali ion water purifier having a known structure, for example. The drive of the primary-side pH adjustment apparatus 15C is controlled by the controller 8.

The discharge flow path 15Ca is provided with an opening/closing valve 12C capable of opening and closing the discharge flow path 15Ca. The opening/closing operation of the opening/closing valve 12C is controlled by the controller 8. A discharge-side backflow prevention mechanism 13C is disposed on the discharge flow path 15Ca downstream of the opening/closing valve 12C in the discharge direction.

The discharge-side backflow prevention mechanism 13C is a mechanism preventing the acidic water from flowing back into the primary-side pH adjustment apparatus 15C. The discharge-side backflow prevention mechanism 13C can prevent the acidic water from mixing again into the alkaline water separated from the hard water. The discharge-side backflow prevention mechanism 13C is made up of one or more check valves, for example.

The secondary-side pH adjustment apparatus 15D is an apparatus increasing the pH of the hard water from which the first metal ions are removed by the primary-side ion removing apparatus 3. In the fifth embodiment, the secondary-side pH adjustment apparatus 15D includes a secondary-side electrolysis apparatus electrolyzing the hard water from which the first metal ions are removed by the primary-side ion removing apparatus 3, to generate acidic water and alkaline water. The secondary-side pH adjustment apparatus 15D is configured to supply the alkaline water as hard water having the increased pH to the secondary-side hard water storage part 5A. The secondary-side pH adjustment apparatus 15D includes a discharge flow path 15Da for discharging the acidic water electrolyzed from the hard water. The secondary-side pH adjustment apparatus 15D can substantially increase the pH of the hard water by separating the acidic water from the hard water while leaving the alkaline water. For example, the pH of the hard water can be increased to 9 or more. The secondary-side pH adjustment apparatus 15D may be an alkali ion water purifier having a known structure, for example. The drive of the secondary-side pH adjustment apparatus 15D is controlled by the controller 8.

The discharge flow path 15Da is provided with an opening/closing valve 12D capable of opening and closing the discharge flow path 15Da. The opening/closing operation of the opening/closing valve 12D is controlled by the controller 8. A discharge-side backflow prevention mechanism 13D is disposed on the discharge flow path 15Da downstream of the opening/closing valve 12D in the discharge direction.

The discharge-side backflow prevention mechanism 13D is a mechanism preventing the acidic water from flowing back into the primary-side pH adjustment apparatus 15D. The discharge-side backflow prevention mechanism 13D can prevent the acidic water from mixing again into the alkaline water separated from the hard water. The discharge-side backflow prevention mechanism 13D is made up of one or more check valves, for example.

Figure 26:
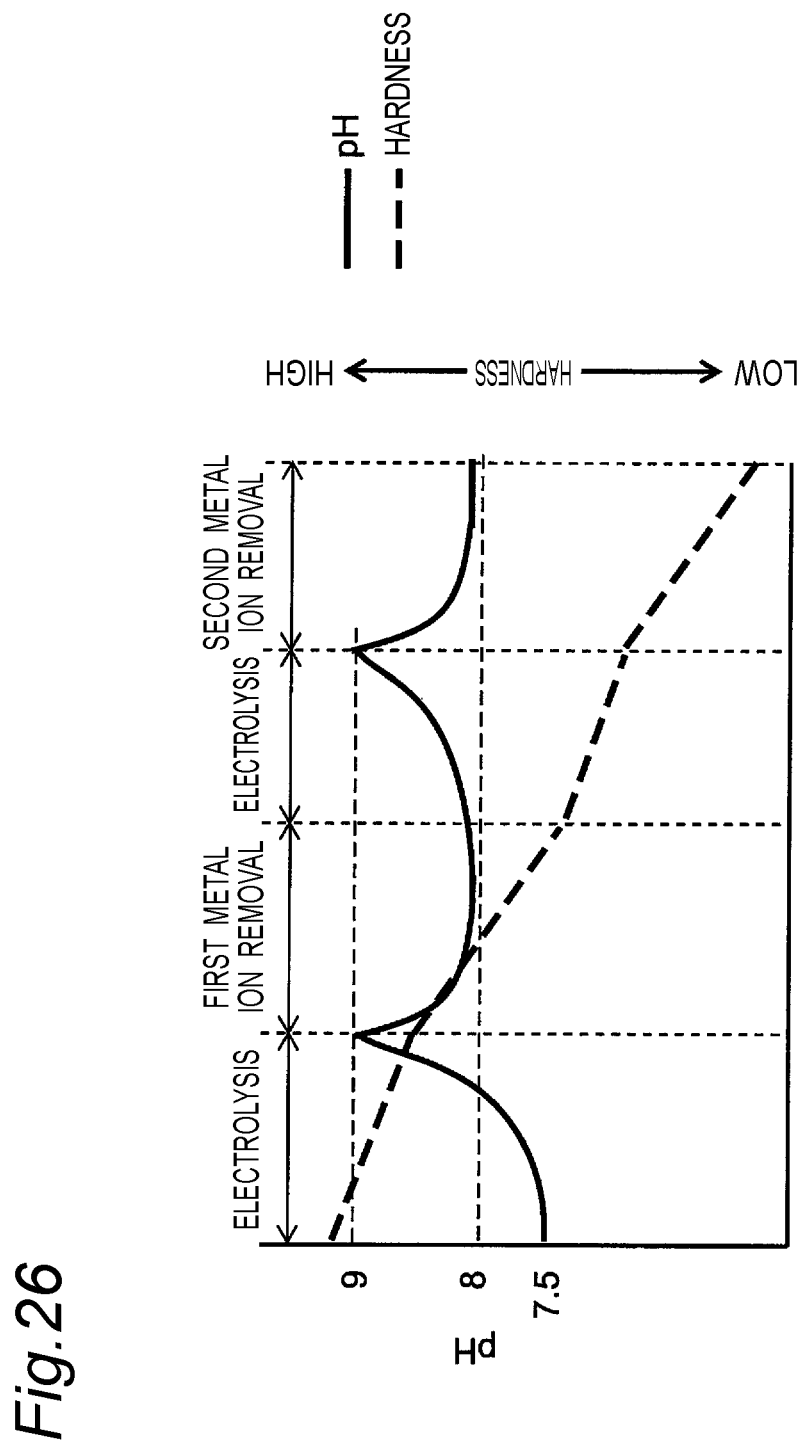
FIG. 26 is a graph schematically showing changes in pH and hardness of hard water flowing through the ion removing system according to the fifth embodiment.

FIG. 26 is a graph schematically showing changes in pH and hardness of hard water flowing through the ion removing system according to the fifth embodiment.

As shown in FIG. 26, since the primary-side pH adjustment apparatus 15C separates the acidic water from the hard water while leaving the alkaline water, the pH of the hard water increases. Since the PH of the hard water increases, the hardness of the hard water slightly decreases. Subsequently, as the first metal ions are removed from the hard water by the primary-side ion removing apparatus 3, the hardness of the hard water decreases, and the pH also decreases. Subsequently, the pH of the hard water is increased by the secondary-side pH adjustment apparatus 15D separating the acidic water from the hard water while leaving the alkaline water. In this case, since the pH of the hard water increases, the hardness of the hard water slightly decreases. Subsequently, as the secondary-side ion removing apparatus 5 removes the second metal ions from the hard water having the increased pH, the hardness of the hard water further decreases, and the pH of the hard water decreases again.

According to the ion removing system of the fifth embodiment, the pH of the hard water can further be increased by the primary-side pH adjustment apparatus 15C separating the acidic water from the hard water while leaving the alkaline water. As a result, the power of adsorption of the first metal ions by the fine bubbles can further be increased to further improve the removal efficiency of the first metal ions. Additionally, the secondary-side pH adjustment apparatus 15D can further increase the pH of the hard water by separating the acidic water from the hard water from which the first metal ions are removed, while leaving the alkaline water. As a result, the power of adsorption of the second metal ions by the fine bubbles can further be increased to further improve the removal efficiency of the second metal ions.

Sixth Embodiment

An ion removing system according to a sixth embodiment of the present disclosure will be described. In the sixth embodiment, differences from the fifth embodiment will mainly be described. In the sixth embodiment, the same or equivalent constituent elements as the fifth embodiment are denoted by the same reference numerals. In the sixth embodiment, the description overlapping with the fifth embodiment will not be made.

Figure 27:
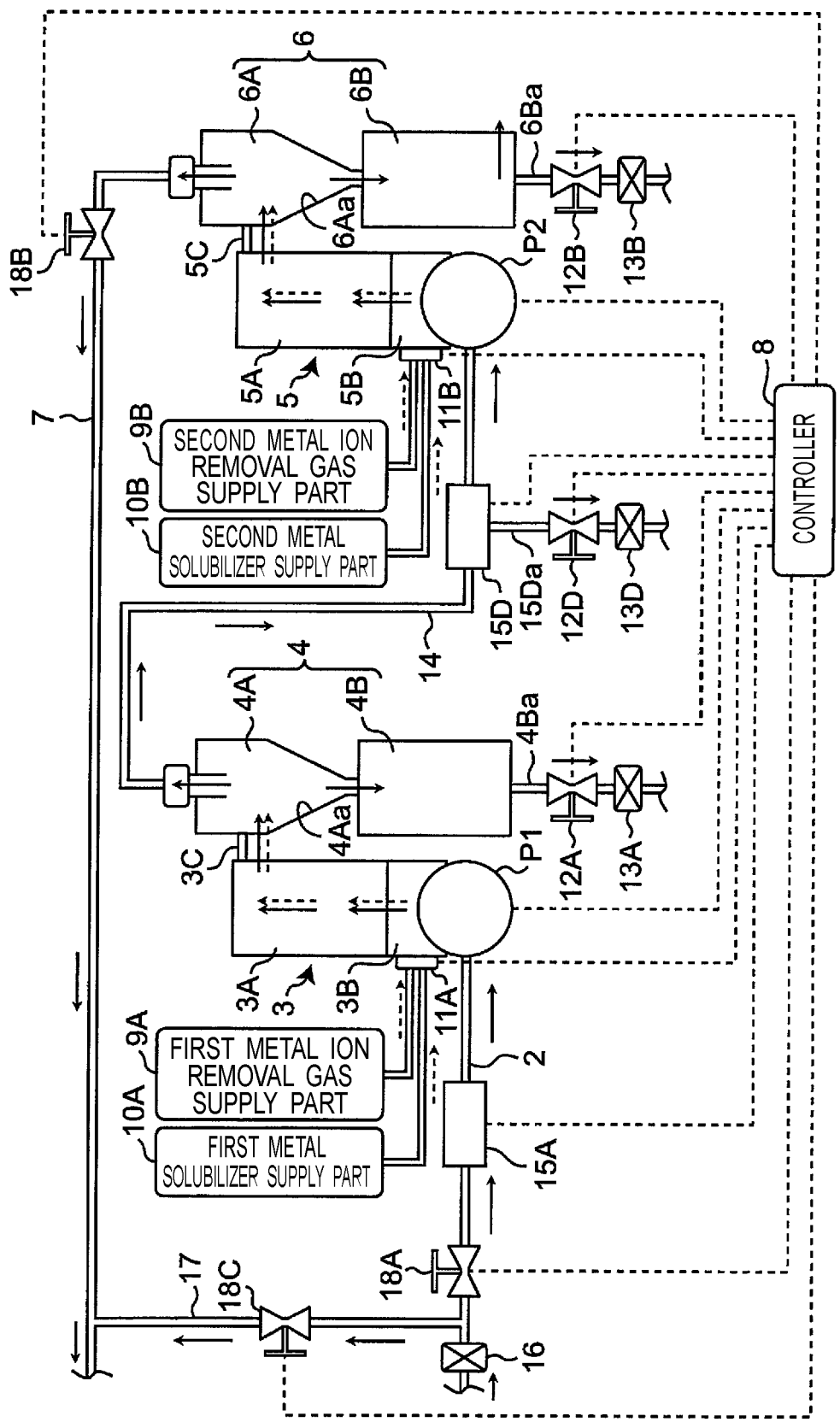
FIG. 27 is a schematic diagram of an ion removing apparatus according to a sixth embodiment.

FIG. 27 is a schematic of the ion removing system according to the sixth embodiment. The sixth embodiment is different from the fifth embodiment in that the primary-side pH adjustment apparatus 15A described above in the fourth embodiment is disposed instead of the primary-side pH adjustment apparatus 15C.

Figure 28:
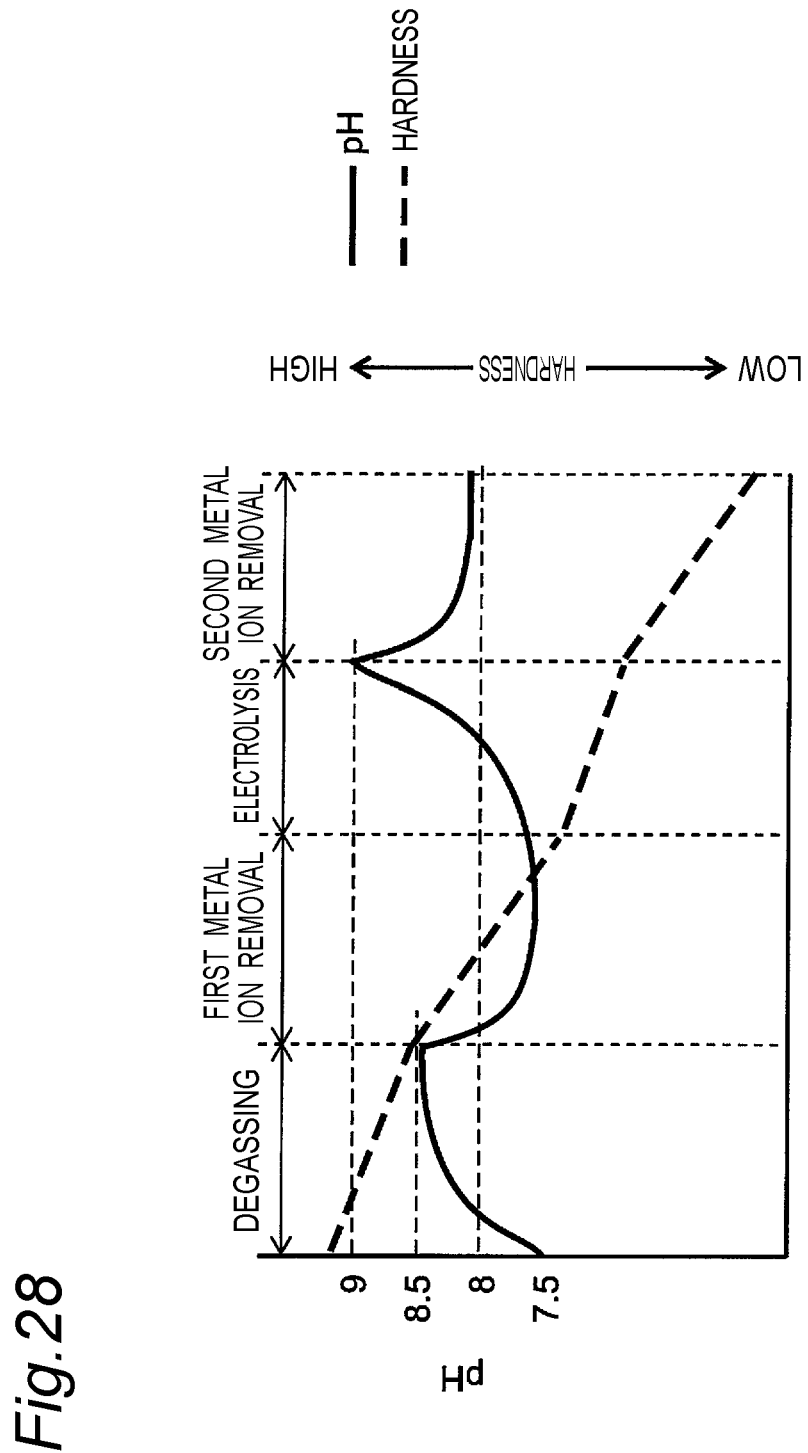
FIG. 28 is a graph schematically showing changes in pH and hardness of hard water flowing through the ion removing system according to the sixth embodiment.

FIG. 28 is a graph schematically showing changes in pH and hardness of hard water flowing through the ion removing system according to the sixth embodiment.

As shown in FIG. 28, since the primary-side pH adjustment apparatus 15A removes carbon dioxide from the hard water, the pH of the hard water increases. Since the pH of the hard water increases, the hardness of the hard water slightly decreases. Subsequently, as the primary-side ion removing apparatus 3 removes the first metal ions from the hard water, the hardness of the hard water decreases, and the pH also decreases. Subsequently, the pH of the hard water is increased by the secondary-side pH adjustment apparatus 15D removing separating the acidic water from the hard water while leaving the alkaline water. In this case, since the pH of the hard water increases, the hardness of the hard water slightly decreases. Subsequently, as the secondary-side ion removing apparatus 5 removes the second metal ions from the hard water having the increased pH, the hardness of the hard water further decreases, and the pH of the hard water decreases again.

The first metal ions in the hard water can be removed even at lower pH than the second metal ions. Therefore, by using the primary-side PH adjustment apparatus 15A instead of the primary-side pH adjustment apparatus 15C, the need for disposing the discharge flow path 15Ca, the opening/closing valve 12C, and the discharge-side backflow prevention mechanism 13C can be eliminated.

In the sixth embodiment, the primary-side pH adjustment apparatus 15A is disposed on the primary-side flow path 2; however, the primary-side pH adjustment apparatuses 15A, 15C may not be disposed on the primary-side flow path 2.

The present disclosure is not limited to the embodiments described above and can be implemented in various other forms. For example, in the above description, air or nitrogen is used as the ion removal gas in the softening treatment; however, the present disclosure is not limited thereto. A gas other than air or nitrogen may be used as the ion removal gas.

In the above description, carbon dioxide is used as the dissolution gas for the regeneration treatment; however, the present disclosure is not limited thereto. For example, the dissolution gas may be hydrogen sulfide ($H_2S \rightarrow ^+ + HS^-$) or hydrogen chloride ($HCL \rightarrow H^+ + CL^-$), which is a gas producing hydrogen ions when dissolved in water.

In the above description, the dissolution gas is used as an example of the solubilizer for the regeneration treatment; however, the present disclosure is not limited thereto. For example, a liquid (dissolution liquid) dissolving the crystals of the metal component may be used as the solubilizer. Examples of such a liquid include hydrochloric acid, sulfuric acid, citric acid, and ascorbic acid.

In the above description, the primary-side separating apparatus 4 and the secondary-side separating apparatus 6 are the cyclone-type centrifugal separating apparatuses; however, the present disclosure is not limited thereto. For example, the primary-side separating apparatus 4 and the secondary-side separating apparatus 6 may be water purification filters such as a hollow fiber membrane.

In the above description, only the fine bubbles containing the ion removal gas are supplied into the hard water; however, the present disclosure is not limited thereto. For example, another gas may be supplied in addition to the fine bubbles containing the ion removal gas into the hard water. In this case, the other gas may be supplied as fine bubbles into the hard water or may be supplied as ordinary bubbles into the hard water.

In the above description, the opening/closing operations of the first valve 18A, the second valve 18B, and the third valve 18C are automatically controlled by the controller 8; however, the present disclosure is not limited thereto. The opening/closing operations of the first valve 18A, the second valve 18B, and the third valve 18C may manually be performed.

In the case described above, the fine bubbles used are obtained by mixing the two types of gases, i.e., the first gas that is a basic gas and the second gas that is a gas having a property of slower dissolution rate than the first gas; however, another gas may be mixed in addition to these two types of gases. Therefore, the fine bubbles of a mixed gas obtained by mixing two or more types of gases including the first gas and the second gas may be used.

In the configuration described above, the first and second metal ions in the hard water are removed; however, the present disclosure is not limited thereto. For example, when the hard water contains three or more types of metal ions, the corresponding numbers of ion removing apparatuses, separating apparatuses, etc. may be disposed to remove the three or more types of metal ions in the hard water.

It is noted that any of the various embodiments and modifications described above can appropriately be combined to produce the effects of the respective embodiments.

Although the present disclosure has been sufficiently described in terms of preferable embodiments with reference to the accompanying drawings, various modifications and corrections are apparent to those skilled in the art. It should be understood that such modifications and corrections are included in the present disclosure without departing from the scope of the present disclosure according to the accompanying claims. Changes in combinations and orders of elements in the embodiments may be achieved without departing from the scope and the idea of the present disclosure.

INDUSTRIAL APPLICABILITY

The ion removing system according to the present disclosure is excellent in maintainability and environmental properties and is therefore useful for both a household ion removing system and an industrial ion removing system.

REFERENCE SIGNS LIST 1 ion removing system
2 primary-side flow path
3 primary-side ion removing apparatus
3A primary-side hard water storage part
3B primary-side fine bubble generating part
3C connection flow path
4 primary-side separating apparatus
4A separating part
4Aa inner circumferential surface
4B crystal storage part
4Ba discharge flow path
5 secondary-side ion removing apparatus
5A secondary-side hard water storage part
5B secondary-side fine bubble generating part
5C connection flow path
6 secondary-side separating apparatus
6A separating part
6Aa inner circumferential surface
6B crystal storage part
6Ba discharge flow path
7 secondary-side flow path
8 controller
9A first metal ion removal gas supply part
9B second metal ion removal gas supply part
10A first metal solubilizer supply part
10B second metal solubilizer supply part
11A primary-side gas switching mechanism
11B secondary-side gas switching mechanism
12A, 12B, 12C, 12D opening/closing valve
13A, 13B, 13C, 13D discharge-side backflow prevention mechanism
14 connection flow path
15A, 15C primary-side pH adjustment apparatus 15B, 15D secondary-side pH adjustment apparatus
16 supply-side backflow prevention mechanism
17 bypass flow path
18A first valve
18B second valve
18C third valve
20 apparatus
21 hard water
22 water tank
22a bottom surface
22b water surface
24 gas supply part
25 first piping
26 fine bubble generating part
27 second piping
28 pump
30 first water intake part
32 second water intake part
34 metal ion concentration detector
40 fine bubble
42 crystal
D1 distance from first water intake part to second water intake part
50 apparatus
52 mixed gas supply part
54 treatment tank
56 first piping
58 second piping
60 water sampling valve
62 water sampler
64 water storage tank
66 pump
68 flow rate adjustment valve
70 flowmeter
72 ammonia supply source
74 nitrogen supply source
76 mixing ratio adjustment valve
78 supply piping
80 fine bubble generating part
82 treated water
84 crystal
90 apparatus
91 water tank
92 first piping
93 pump
94 second piping
95 mist nozzle
96 hard water
97 sample
98 opening/closing valve

The invention claimed is:

1. An ion removing system comprising:
a primary-side ion removal apparatus that comprises a primary-side hard water storage part storing hard water and a primary-side fine bubble generating part generating and supplying fine bubbles to the primary-side hard water storage part and that causes the fine bubbles to adsorb first metal ions in the hard water in the primary-side hard water storage part to remove the first metal ions from the hard water;
a secondary-side pH adjustment apparatus increasing pH of the hard water from which the first metal ions are removed by the primary-side ion removal apparatus; and
a secondary-side ion removal apparatus that comprises a secondary-side hard water storage part storing hard water having pH increased by the secondary-side pH adjustment apparatus and a secondary-side fine bubble generating part generating and supplying fine bubbles to the secondary-side hard water storage part and that causes the fine bubbles to adsorb second metal ions in the hard water in the secondary-side hard water storage part to remove the second metal ions from the hard water.

2. The ion removing system according to claim 1, wherein the secondary-side pH adjustment apparatus comprises a secondary-side degassing apparatus removing carbon dioxide contained in the hard water from which the first metal ions are removed by the primary-side ion removal apparatus.

3. The ion removing system according to claim 1, wherein the secondary-side pH adjustment apparatus comprises a secondary-side electrolysis apparatus electrolyzing the hard water from which the first metal ions are removed by the primary-side ion removal apparatus, to generate acidic water and alkaline water, and the secondary-side pH adjustment apparatus is configured to supply the alkaline water as hard water having the increased pH to the secondary-side hard water storage part.

4. The ion removing system according to claim 1, further comprising a primary-side pH adjustment apparatus increasing the pH of the hard water contained in the primary-side hard water storage part.

5. The ion removing system according to claim 4, wherein the primary-side pH adjustment apparatus comprises a primary-side degassing apparatus for removing carbon dioxide contained in the hard water.

6. The ion removing system according to claim 4, wherein the primary-side pH adjustment apparatus comprises a primary-side electrolysis apparatus for electrolyzing the hard water to generate acidic water and alkaline water and the primary-side pH adjustment apparatus is configured to increase the pH of the hard water by separating the acidic water from the hard water while leaving the alkaline water and to supply the alkaline water as the hard water to the primary-side hard water storage part.

* * * * *